(12) United States Patent
Karube

(10) Patent No.: US 12,531,964 B2
(45) Date of Patent: Jan. 20, 2026

(54) DISASTER INFORMATION PROCESSING APPARATUS, OPERATION METHOD OF DISASTER INFORMATION PROCESSING APPARATUS, OPERATION PROGRAM OF DISASTER INFORMATION PROCESSING APPARATUS, AND DISASTER INFORMATION PROCESSING SYSTEM

(71) Applicant: FUJIFILM Corporation, Tokyo (JP)

(72) Inventor: Mikihiko Karube, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 357 days.

(21) Appl. No.: 18/188,944

(22) Filed: Mar. 23, 2023

(65) Prior Publication Data

US 2023/0231975 A1 Jul. 20, 2023

Related U.S. Application Data

(63) Continuation of application No. PCT/JP2021/034263, filed on Sep. 17, 2021.

(30) Foreign Application Priority Data

Oct. 1, 2020 (JP) ................. 2020-167013

(51) Int. Cl.
  *H04N 7/18* (2006.01)
  *G06T 7/00* (2017.01)
  *H04N 23/695* (2023.01)
(52) U.S. Cl.
  CPC ........... *H04N 7/181* (2013.01); *G06T 7/0002* (2013.01); *H04N 23/695* (2023.01); *G06T 2207/30184* (2013.01); *G06T 2207/30232* (2013.01)

(58) Field of Classification Search
  CPC ...... H04N 7/181; H04N 7/188; H04N 23/695; H04N 23/61; H04N 23/90; H04N 23/69;
  (Continued)

(56) References Cited

U.S. PATENT DOCUMENTS 10,007,992 B1 * 6/2018 Harvey ................ G06V 20/182
10,134,092 B1 * 11/2018 Harvey ................ G06V 20/176
(Continued)

FOREIGN PATENT DOCUMENTS

JP   2006-165981 A   6/2006
JP   2013-187760 A   9/2013
(Continued)

OTHER PUBLICATIONS

Gupta et al., xBD: A Dataset for Assessing Building Damage from Satellite Imagery,2019, arXiv:1911.09296v1, pp. 1-9. (Year: 2019).*
(Continued)

*Primary Examiner* — Kathleen M Broughton
(74) *Attorney, Agent, or Firm* — Studebaker Brackett PLLC

(57) ABSTRACT

Provided are a disaster information processing apparatus, an operation method of a disaster information processing apparatus, an operation program of a disaster information processing apparatus, and a disaster information processing system capable of controlling an operation of a surveillance camera suitable for an environmental condition of a disaster-stricken area. An effective field of view range derivation unit derives and acquires an effective field of view range in a bird's-eye view image of an area captured by a surveillance camera, and a damage situation of the area being able to be grasped in the effective field of view range, and the effective field of view range changing depending on an environmental condition of the area. A control signal generation unit generates a control signal of the surveillance camera corre-
(Continued)

sponding to the effective field of view range. An operation of the surveillance camera is controlled by the control signal.

10 Claims, 21 Drawing Sheets

(58) Field of Classification Search
CPC ......... G06T 7/0002; G06T 2207/30184; G06T 2207/30232; G08B 21/10
See application file for complete search history.

(56) References Cited

U.S. PATENT DOCUMENTS

| | | | |
|---|---|---|---|
| 2007/0254716 A1 | 11/2007 | Matsuoka et al. | |
| 2017/0270612 A1* | 9/2017 | Howe | G06V 20/176 |
| 2018/0089763 A1* | 3/2018 | Okazaki | G06N 3/045 |
| 2023/0230371 A1* | 7/2023 | Nagatani | G06V 10/764 |
| | | | 382/159 |
| 2023/0239437 A1* | 7/2023 | Karube | H04N 23/61 |
| | | | 348/144 |
| 2024/0005770 A1* | 1/2024 | Watanabe | G06Q 50/26 |

FOREIGN PATENT DOCUMENTS

| | | | | |
|---|---|---|---|---|
| JP | 2020-017102 A | | 1/2020 | |
| KR | 20170101519 A | * | 9/2017 | ............ G08B 21/10 |

OTHER PUBLICATIONS

International Search Report issued in PCT/JP2021/034263; mailed Nov. 30, 2021.
International Preliminary Report on Patentability (Chapter I) and Written Opinion of the International Searching Authority issued in PCT/JP2021/034263; issued Mar. 28, 2023.
"Notice of Reasons for Refusal" Office Action issued in JP 2022-553831; mailed by the Japanese Patent Office on Feb. 18, 2025.

* cited by examiner

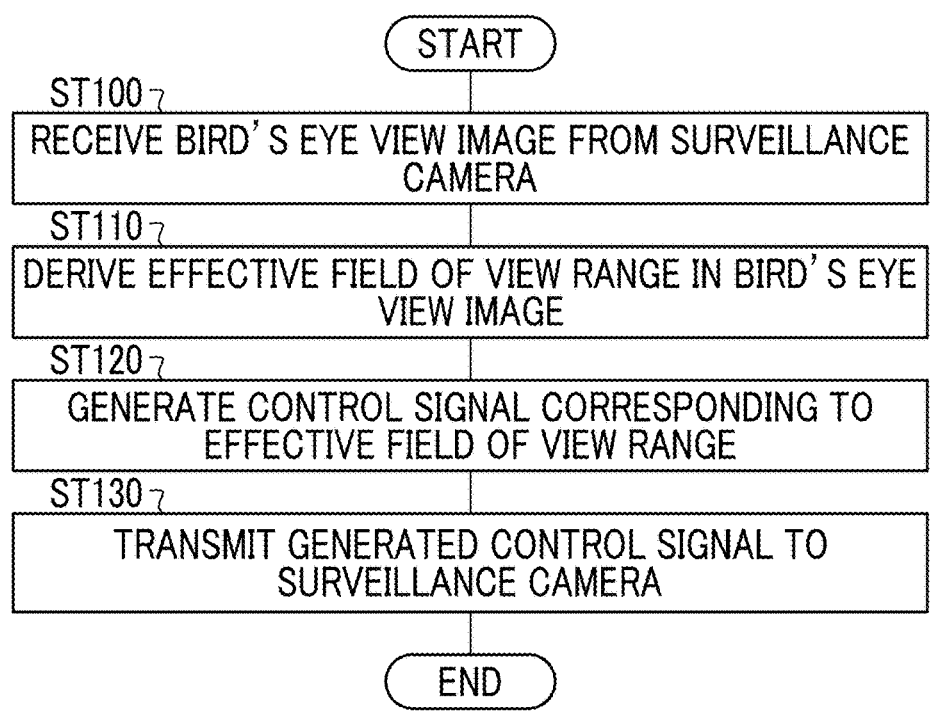
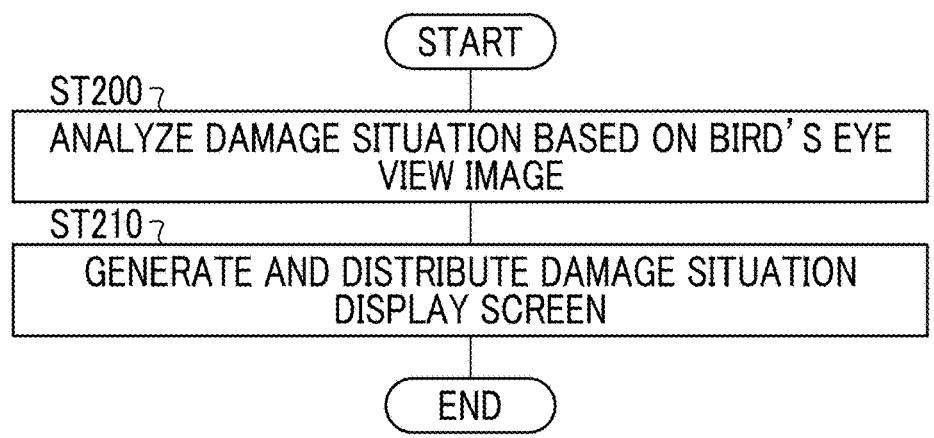
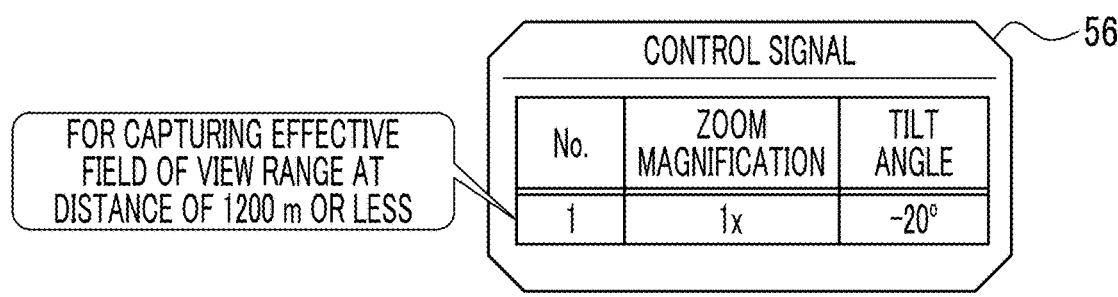

DISASTER INFORMATION PROCESSING APPARATUS, OPERATION METHOD OF DISASTER INFORMATION PROCESSING APPARATUS, OPERATION PROGRAM OF DISASTER INFORMATION PROCESSING APPARATUS, AND DISASTER INFORMATION PROCESSING SYSTEM

CROSS-REFERENCE TO RELATED APPLICATIONS

This application is a continuation application of International Application No. PCT/JP2021/034263 filed on Sep. 17, 2021, the disclosure of which is incorporated herein by reference in its entirety. Further, this application claims priority from Japanese Patent Application No. 2020-167013 filed on Oct. 1, 2020, the disclosure of which is incorporated herein by reference in its entirety.

BACKGROUND

1. Technical Field

The disclosed technology relates to a disaster information processing apparatus, an operation method of a disaster information processing apparatus, an operation program of a disaster information processing apparatus, and a disaster information processing system.

2. Description of the Related Art

Various disasters such as earthquakes, tsunamis, volcanic eruptions, floods and/or landslides caused by heavy rains, and large-scale fires have been occurring in various places. In the related art, various countermeasures for grasping a damage situation of such a disaster have been proposed. For example, JP2013-187760A describes a technology of acquiring a bird's-eye view image of a disaster-stricken area captured by a surveillance camera and grasping a damage situation of the disaster from the acquired bird's-eye view image. In JP2013-187760A, an installation position of the surveillance camera, an imaging range of the surveillance camera, and the like are stored, and a surveillance camera capable of capturing a desired bird's-eye view image is found out based on such information.

SUMMARY

The imaging range of the surveillance camera described in JP2013-187760A is one range determined based on performance of the surveillance camera on the assumption that an environmental condition of the disaster-stricken area is a specific condition. However, an effective field of view range in which the damage situation of a disaster can be actually grasped from the bird's-eye view image depends on the environmental condition of the disaster-stricken area such as weather such as sunny, cloudy, rainy, and snowy, dust caused by collapse of a building, or fire smoke accordingly. Thus, there is a concern that information on the imaging range of the surveillance camera is used alone to make a mistake in finding out the surveillance camera capable of capturing the desired bird's-eye view image.

One embodiment according to the disclosed technology provides a disaster information processing apparatus, an operation method of a disaster information processing apparatus, an operation program of a disaster information processing apparatus, and a disaster information processing system capable of controlling an operation of a surveillance camera suitable for an environmental condition of a disaster-stricken area.

A disaster information processing apparatus of the present disclosure comprises a processor, and a memory connected to or built in the processor. The processor is configured to acquire an effective field of view range in a bird's eye view image of a disaster-stricken area captured by a surveillance camera, a damage situation of the disaster-stricken area being able to be grasped in the effective field of view range, and the effective field of view range changing depending on an environmental condition of the disaster-stricken area; and control an operation of the surveillance camera based on the acquired effective field of view range.

It is preferable that the processor is configured to perform at least one of setting of a zoom magnification of the surveillance camera, setting of a tilt angle of the surveillance camera, or setting of whether or not to capture the bird's eye view image based on the effective field of view range.

It is preferable that the processor is configured to acquire the effective field of view range from the bird's eye view image captured in real time by the surveillance camera.

It is preferable that the effective field of view ranges corresponding to the environmental conditions of a plurality of patterns are stored in a storage unit in advance, and the processor is configured to acquire the effective field of view range corresponding to a current environmental condition of the disaster-stricken area from the storage unit.

It is preferable that a plurality of the surveillance cameras are provided, and the processor is configured to control an operation of each of the plurality of surveillance cameras based on the effective field of view range of each of the plurality of surveillance cameras.

It is preferable that the processor is configured to analyze the damage situation for each building of the disaster-stricken area by using the bird's eye view image.

It is preferable that the processor is configured to analyze the damage situation of a building as an analysis target of the damage situation by using the bird's eye view images captured by a plurality of the surveillance cameras in a case where the building as the analysis target is captured by the plurality of surveillance cameras.

It is preferable that the processor is configured to analyze the damage situation for each compartment including a plurality of adjacent buildings of the disaster-stricken area by using the bird's eye view image.

It is preferable that the processor is configured to analyze the damage situation of a compartment as an analysis target of the damage situation by using the bird's eye view images captured by a plurality of the surveillance cameras in a case where the compartment as the analysis target is captured by the plurality of surveillance cameras.

An operation method of a disaster information processing apparatus of the present disclosure comprises acquiring an effective field of view range in a bird's eye view image of a disaster-stricken area captured by a surveillance camera, a damage situation of the disaster-stricken area being able to be grasped in the effective field of view range, and the effective field of view range changing depending on an environmental condition of the disaster-stricken area, and controlling an operation of the surveillance camera based on the acquired effective field of view range.

An operation program of a disaster information processing apparatus of the present disclosure causes a computer to execute processing of acquiring an effective field of view range in a bird's eye view image of a disaster-stricken area captured by a surveillance camera, a damage situation of the disaster-stricken area being able to be grasped in the effective field of view range, and the effective field of view range changing depending on an environmental condition of the disaster-stricken area, and controlling an operation of the surveillance camera based on the acquired effective field of view range.

A disaster information processing system of the present disclosure comprises a surveillance camera that captures a bird's eye view image provided for grasping a damage situation of a disaster-stricken area, a processor, and a memory connected to or built in the processor. The processor is configured to acquire an effective field of view range, in which the damage situation in the bird's eye view image is able to be grasped and which changes depending on an environmental condition of the disaster-stricken area, and control an operation of the surveillance camera based on the acquired effective field of view range.

According to the disclosed technology, it is possible to provide the disaster information processing apparatus, the operation method of a disaster information processing apparatus, the operation program of a disaster information processing apparatus, and the disaster information processing system capable of controlling the operation of the surveillance camera suitable for the environmental conditions of the disaster-stricken area.

BRIEF DESCRIPTION OF THE DRAWINGS

Exemplary embodiments according to the technique of the present disclosure will be described in detail based on the following figures, wherein:

FIG. 13 is a diagram showing a processing procedure of the disaster information processing server;

FIG. 14 is a diagram showing a processing procedure of the disaster information processing server;

FIG. 15 is a diagram showing another example of the control signal;

DETAILED DESCRIPTION

First Embodiment

Figure 1:
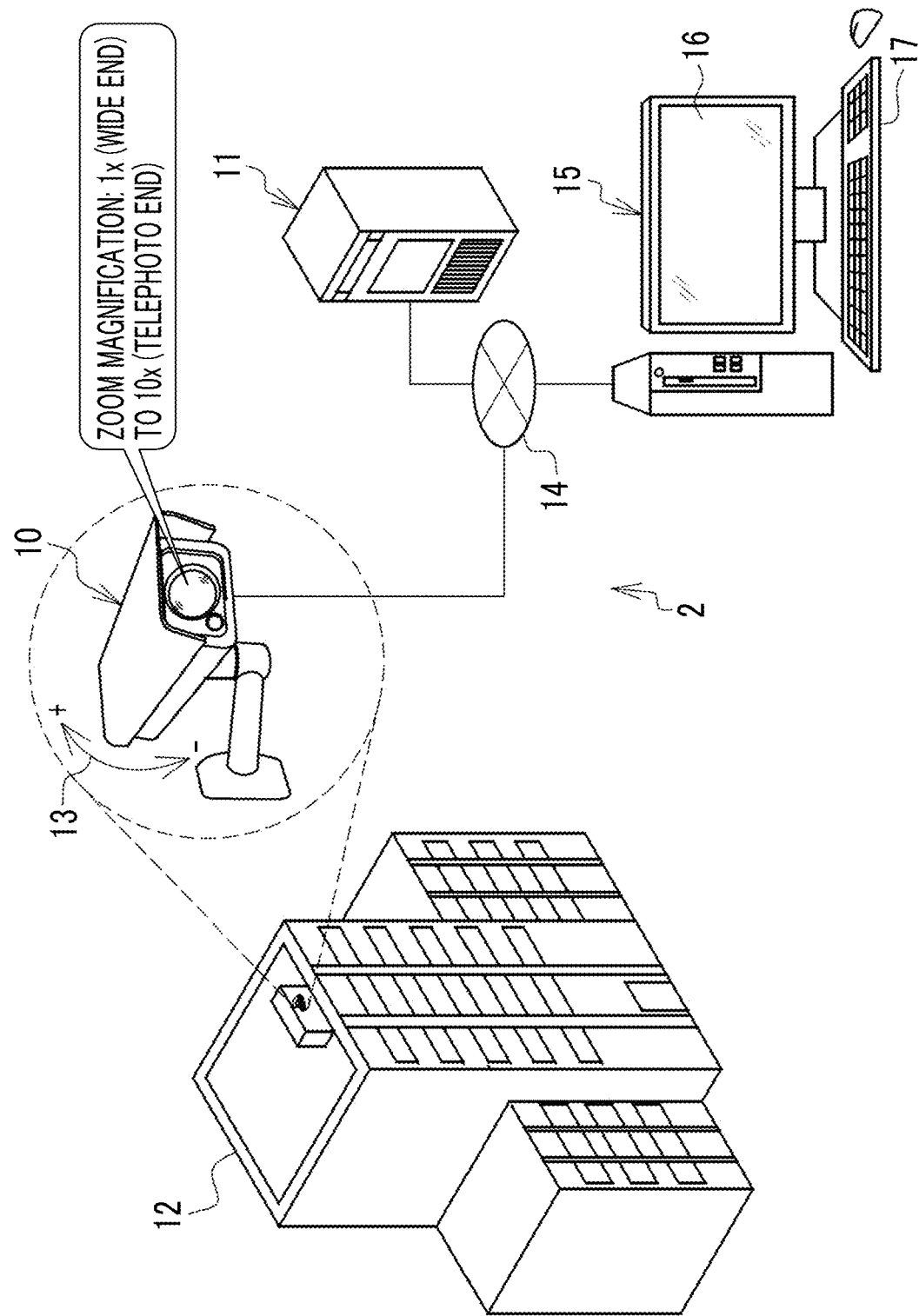
FIG. 1 is a diagram showing a disaster information processing system.

As an example, as shown in FIG. 1, a disaster information processing system 2 for grasping a damage situation of a disaster comprises a surveillance camera 10 and a disaster information processing server 11. The surveillance camera 10 is installed on a roof of a high-rise building 12 having a height of, for example, about 50 m to 100 m above the ground. As indicated by an arrow 13, the surveillance camera 10 is capable of swinging in a positive direction (upward direction) and a negative direction (downward direction), that is, performing a tilt operation. In addition, the surveillance camera 10 has a zoom lens, and it is possible to set a zoom magnification in a range from 1× (wide end) to, for example, 10× (telephoto end). The disaster information processing server 11 is installed in, for example, a disaster response headquarters (agency, government office, or the like) of a local public entity such as a prefecture or a municipality. The disaster information processing server 11 is an example of a "disaster information processing apparatus" according to the disclosed technology. The surveillance camera 10 may be capable of swinging in a left-right direction, that is, performing a panning operation.

The surveillance camera 10 and the disaster information processing server 11 are connected to each other via a network 14 to be communicable with each other. The surveillance camera 10 and the disaster information processing server 11 are connected to the network 14 in a wired or wireless manner. The network 14 is a wide area network (WAN) of, for example, the Internet, a public communication network, or the like. In a case where WAN is used, it is preferable that a virtual private network (VPN) is constructed or a communication protocol having a high security level such as Hypertext Transfer Protocol Secure (HTTPS) is used in consideration of information security.

A client terminal 15 is also connected to the network 14 in a wired or wireless manner. The client terminal 15 is, for example, a desktop personal computer owned by a staff member of the disaster response headquarters and has a display 16 and an input device 17. Various screens are displayed on the display 16. The input device 17 is a keyboard, a mouse, a touch panel, a microphone, or the like. Although only one client terminal 15 is drawn in FIG. 1, of course, a plurality of client terminals 15 may be provided.

Figure 2:
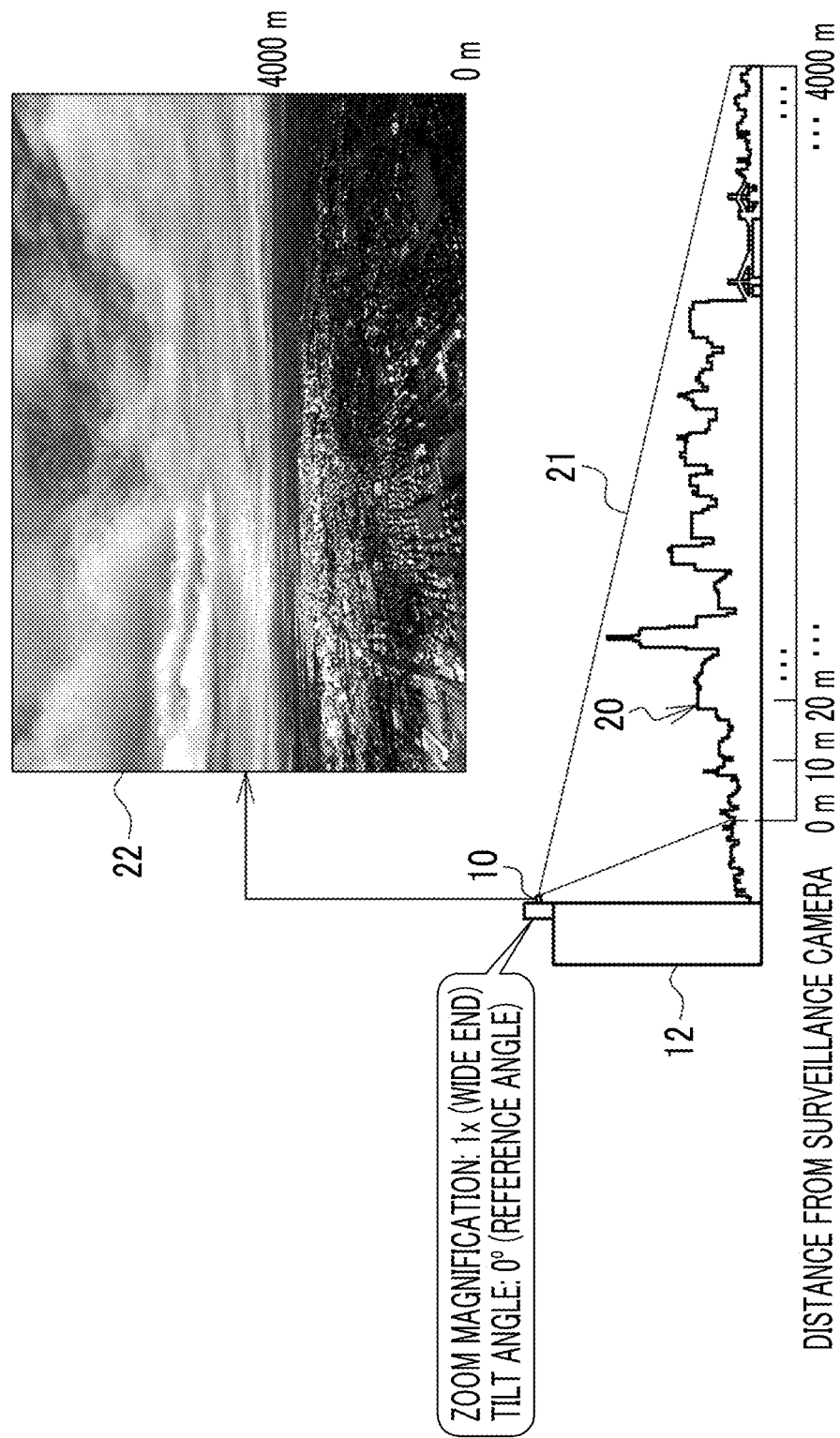
FIG. 2 is a diagram showing a relationship between an area and an imaging range.

As an example, as shown in FIG. 2, the surveillance camera 10 captures an imaging range 21 including an area 20 according to a preset frame rate (for example, 30 frames per second (fps)), and outputs a bird's-eye view image 22 of the area 20. The imaging range 21 is a range determined based on the performance of the surveillance camera 10 in a case where the zoom magnification is 1× (wide end) and the tilt angle is 0° (reference angle). The imaging range 21 is, for example, 4000 m in terms of a distance from the surveillance camera 10. Here, a base (lower side of the bird's-eye view image 22) of the imaging range 21 is a distance of 0 m from the surveillance camera 10. The area 20 is an area where the disaster response headquarters is located due to the disaster, and is an example of a "disaster-stricken area" according to the disclosed technology.

Figure 3:
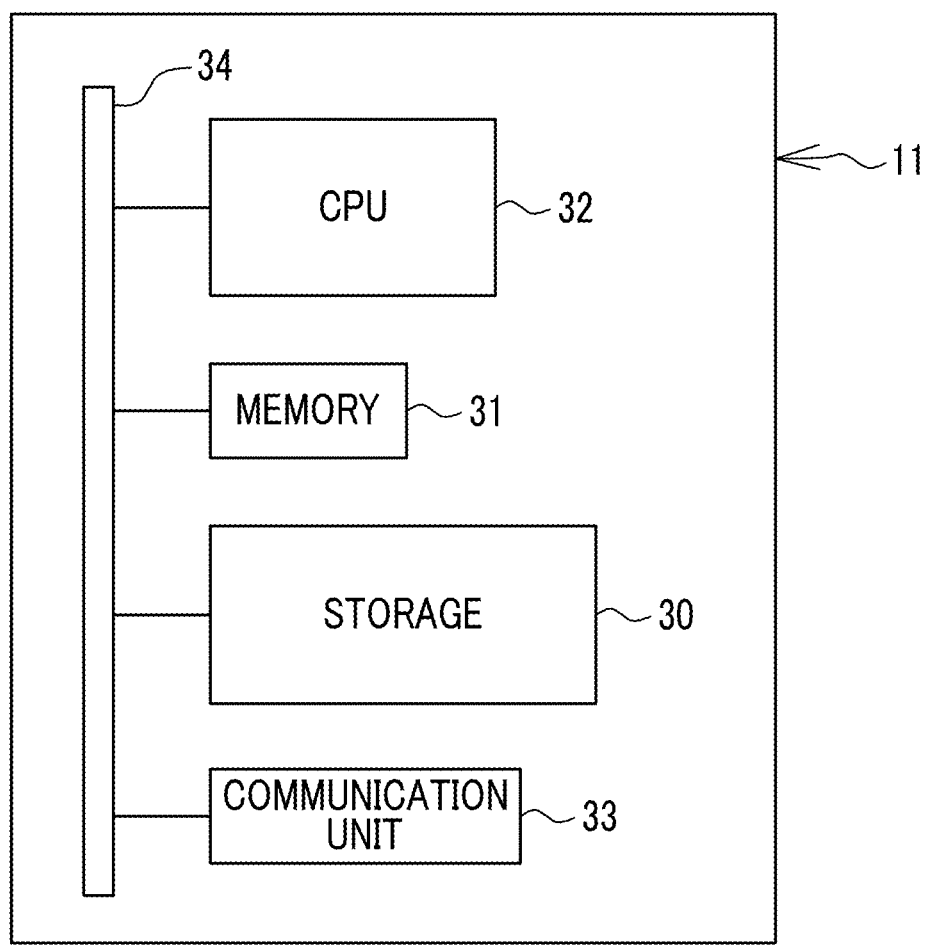
FIG. 3 is a block diagram showing a computer constituting a disaster information processing server.

As an example, as shown in FIG. 3, a computer constituting the disaster information processing server 11 comprises a storage 30, a memory 31, a central processing unit (CPU) 32, and a communication unit 33. These components are interconnected via a busline 34. The storage 30 is an example of a "storage unit" according to the disclosed technology.

In addition, the CPU 32 is an example of a "processor" according to the disclosed technology.

The storage device 30 is a hard disk drive built in the computer constituting the disaster information processing server 11 or connected via a cable or a network. Alternatively, the storage device 30 is a disk array in which a plurality of hard disk drives are connected in series. The storage 30 stores a control program such as an operating system, various application programs, various kinds of data associated with these programs, and the like. A solid state drive may be used instead of the hard disk drive.

The memory 31 is a work memory for the CPU 32 to execute processing. The CPU 32 loads the program stored in the storage 30 into the memory 31 and executes processing corresponding to the program. Accordingly, the CPU 32 comprehensively controls an operation of each unit of the computer. The communication unit 33 performs transmission control of various kinds of information to an external device such as the surveillance camera 10. The memory 31 may be built in the CPU 32.

Figure 4:
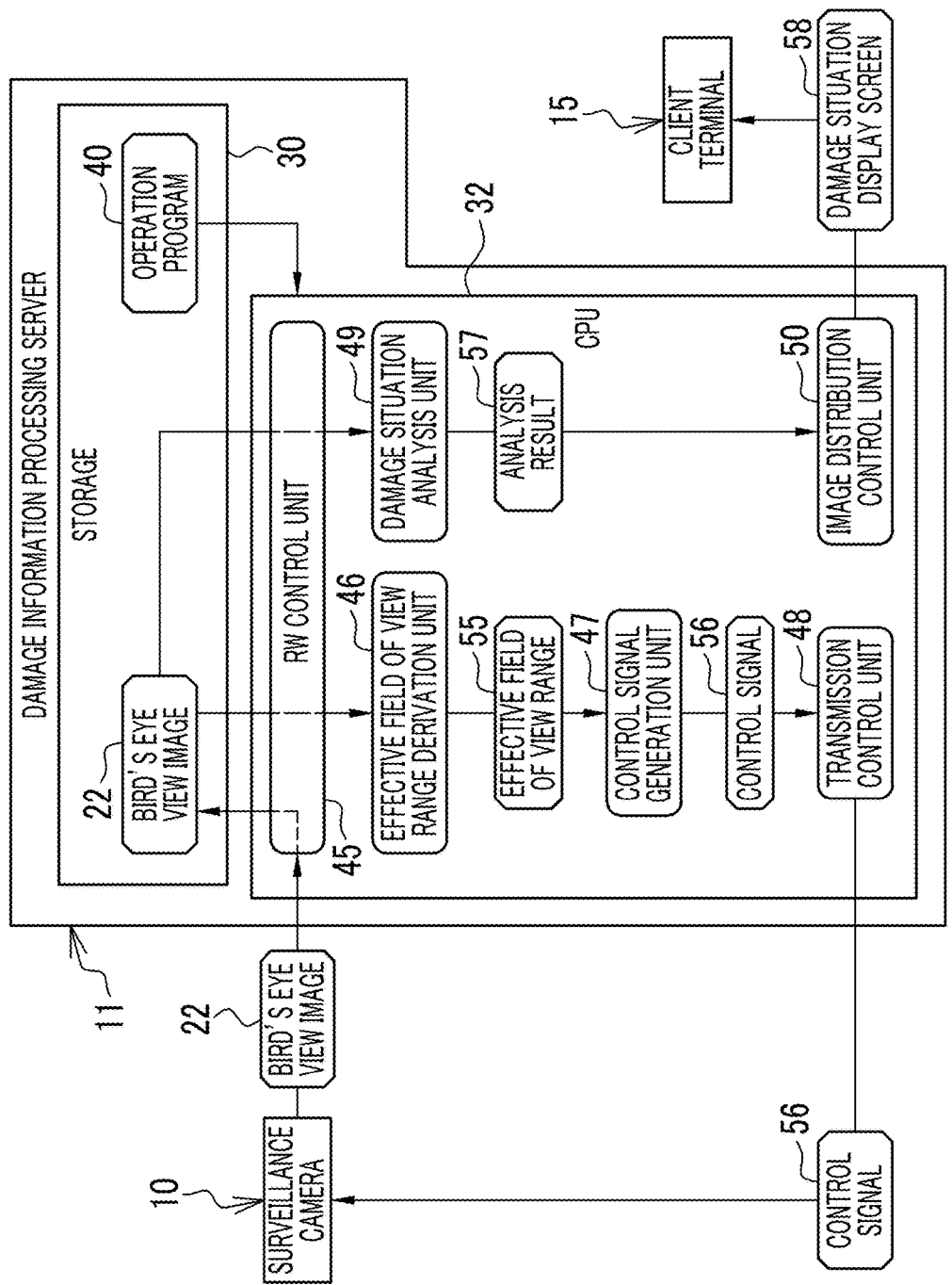
FIG. 4 is a block diagram showing a processing unit of a CPU of the disaster information processing server.

As an example, as shown in FIG. 4, an operation program 40 is stored in the storage 30 of the disaster information processing server 11. The operation program 40 is an application program for causing the computer to function as the disaster information processing server 11. That is, the operation program 40 is an example of the "operation program of the disaster information processing apparatus" according to the disclosed technology.

In a case where the operation program 40 is started, the CPU 32 of the computer constituting the disaster information processing server 11 functions as a read and write (hereinafter, abbreviated as RW) control unit 45, an effective field of view range derivation unit 46, a control signal generation unit 47, a transmission control unit 48, a damage situation analysis unit 49, and a screen distribution control unit 50 in cooperation with the memory 31 and the like.

The RW control unit 45 controls the storage of various kinds of data in the storage 30 and the reading-out of various kinds of data in the storage 30. For example, the RW control unit 45 receives the bird's-eye view image 22 from the surveillance camera 10 and stores the received bird's-eye view image 22 in the storage 30. In a case where a processing request (not shown) from the client terminal 15 is received, the RW control unit 45 reads out the bird's-eye view image 22 from the storage 30 and outputs the read-out bird's-eye view image 22 to the effective field of view range derivation unit 46. In a case where a distribution request (not shown) from the client terminal 15 is received, the RW control unit 45 reads out the bird's-eye view image 22 from the storage 30 and outputs the read-out bird's-eye view image 22 to the damage situation analysis unit 49. The storage of the bird's-eye view image 22 in the storage 30 is performed in response to an instruction from a staff member of the disaster response headquarters.

The effective field of view range derivation unit 46 derives an effective field of view range 55 in the bird's-eye view image 22 obtained by a default setting in which the zoom magnification is 1× and the tilt angle is 0°. The effective field of view range 55 is different from the imaging range 21 shown in FIG. 2 and changes depending on environmental conditions of the area 20. The effective field of view range derivation unit 46 outputs the derived effective field of view range 55 to the control signal generation unit 47.

The control signal generation unit 47 generates a control signal 56 of the surveillance camera 10 corresponding to the effective field of view range 55. The control signal generation unit 47 outputs the generated control signal 56 to the transmission control unit 48. The transmission control unit 48 performs control such that the control signal 56 is transmitted to the surveillance camera 10.

The damage situation analysis unit 49 analyzes a damage situation 69 (see FIG. 11) of the disaster in the area 20 based on the bird's-eye view image 22. The damage situation analysis unit 49 outputs an analysis result 57 of the damage situation 69 to the screen distribution control unit 50.

The screen distribution control unit 50 generates a damage situation display screen 58 based on the analysis result 57. The screen distribution control unit 50 performs control such that screen data of the generated damage situation display screen 58 is distributed to the client terminal 15 that is a request source of the distribution request. The screen data is, for example, screen data for web distribution created by a markup language such as Extensible Markup Language (XML). The client terminal 15 reproduces and displays the damage situation display screen 58 on a web browser based on the screen data. Another data description language such as JSON (Javascript (registered trademark) Object Notation) may be used instead of XML.

Figure 5:
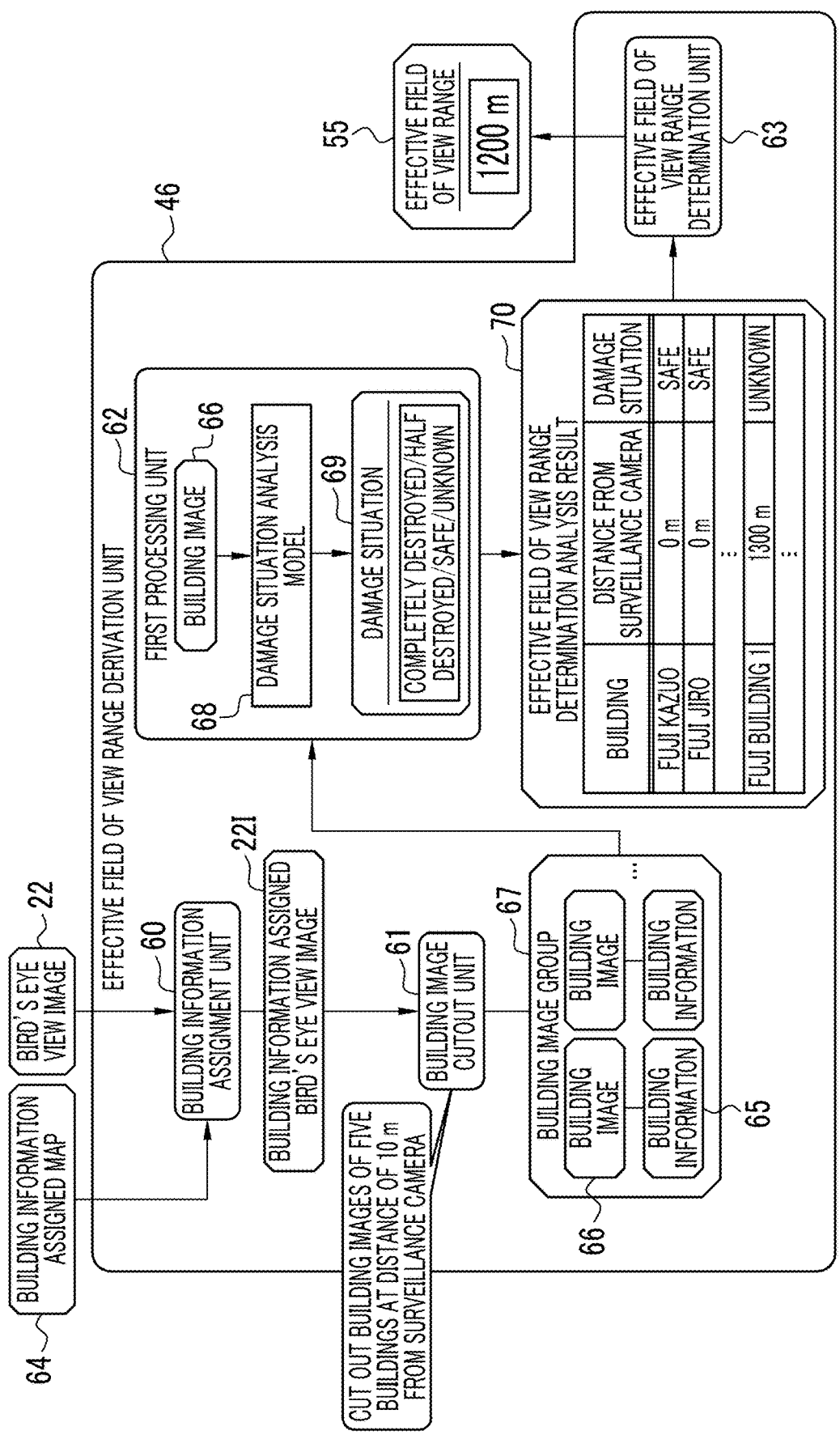
FIG. 5 is a block diagram showing details of an effective field of view range derivation unit.

As an example, as shown in FIG. 5, the effective field of view range derivation unit 46 includes a building information assignment unit 60, a building image cutout unit 61, a first processing unit 62, and an effective field of view range determination unit 63. The building information assignment unit 60 assigns building information 65 to each building 78 (see FIG. 7) appearing in the bird's-eye view image 22 while referring to a building information assigned map 64, and uses the bird's-eye view image 22 as a building information assigned bird's-eye view image 221. The building information assignment unit 60 outputs the building information assigned bird's-eye view image 221 to the building image cutout unit 61.

The building information assigned map 64 is stored in the storage 30, is read out from the storage 30 by the RW control unit 45, and is output to the building information assignment unit 60. The building information assigned map 64 is a three-dimensional map of the area 20, and feature points such as corners of a roof and the building information 65 are associated with each building 78. Specifically, the building information 65 is a name of an owner of the building (house) 78 such as "Fuji Kazuo" or a name of the building 78 such as "Fuji Building 1". The building information 65 also includes a distance of the building 78 from the surveillance camera 10, an address of the building 78, and the like.

The building information assignment unit 60 adjusts an orientation of a building on the building information assigned map 64 to an orientation of the building 78 appearing in the bird's-eye view image 22 based on longitude and latitude information, a tilt angle of an installation position of the surveillance camera 10, and the like. The building information assignment unit 60 extracts feature points such as corners of a roof of the building 78 appearing in the bird's-eye view image 22. The building information assignment unit 60 matches the building information assigned map 64 adjusted to the orientation of the building 78 appearing in the bird's-eye view image 22 and the bird's-eye view image 22, and searches for a position where a correlation between feature points of the building information assigned map 64 and feature points of the bird's-eye view image 22 is highest. At the position where the correlation is highest, the building information 65 of the building information assigned map 64 is assigned to each building 78 of the bird's-eye view image 22.

The building image cutout unit 61 cuts out building images 66 of any five buildings 78 from the building information assigned bird's-eye view image 221, for example, at a distance of 10 m from the surveillance camera 10. The building image cutout unit 61 uses, for example, a machine learning model (not shown) using the bird's-eye view image 22 as an input image and the image of each building 78 appearing in the bird's-eye view image 22 as an output image. The building image cutout unit 61 outputs, to the first processing unit 62, a building image group 67 including a set of the building images 66 and the pieces of building information 65 of any five buildings 78 at a distance of 10 m from the surveillance camera 10.

The first processing unit 62 inputs the building images 66 into a damage situation analysis model 68. The damage situation 69 is output from the damage situation analysis model 68. The damage situation 69 assumes an earthquake or the like as the disaster, and is any one of "completely destroyed", "half destroyed", "safe", or "unknown". The first processing unit 62 outputs the damage situation 69 from the damage situation analysis model 68 for all of the building images 66 of five buildings 78 at a distance of 10 m from the surveillance camera 10, which are included in the building image group 67. The first processing unit 62 outputs, to the effective field of view range determination unit 63, an effective field of view range determination analysis result 70 in which the damage situation 69 of each building 78 is summarized together with the distance from the surveillance camera 10.

The effective field of view range determination unit 63 determines the effective field of view range 55 based on the effective field of view range determination analysis result 70. In FIG. 5, a case where the damage situations 69 of the buildings 78 of "Fuji Kazuo" and "Fuji Jiro" of which a distance from the surveillance camera 10 is 0 m are "safe" and the damage situation 69 of "Fuji Building 1" of which the distance from the surveillance camera 10 is 1300 m is "unknown" is illustrated. A case where the effective field of view range 55 is narrower than the imaging range 21 due to an influence of cloudiness, fog, rain, snow, smog, or the like, and the effective field of view range 55 is determined to be "1200 m" is illustrated.

The damage situation analysis model 68 is a machine learning model constructed by a method such as a neural network, a support vector machine, or boosting. The damage situation analysis model 68 is stored in the storage 30, is read out from the storage 30 by the RW control unit 45, and is output to the first processing unit 62.

Figure 6:
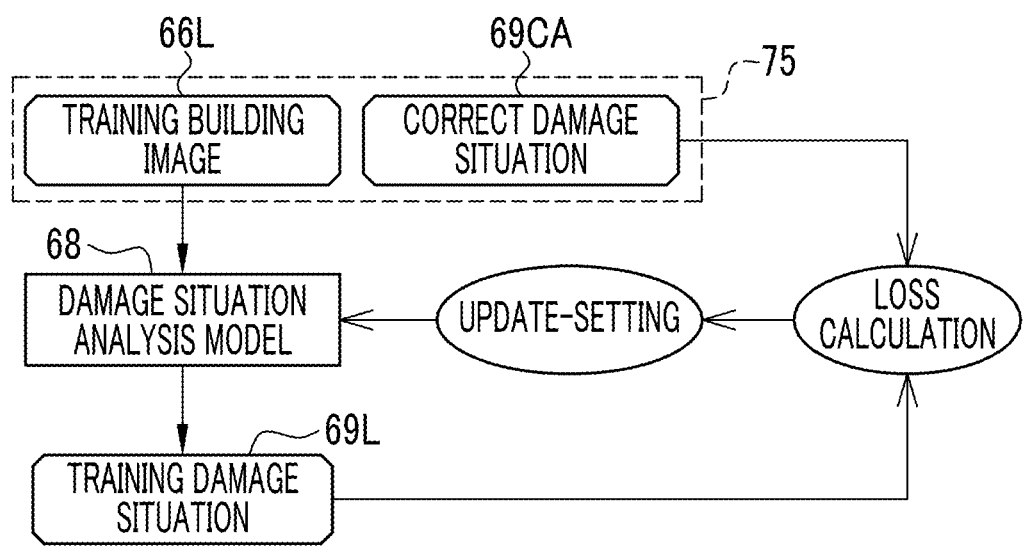
FIG. 6 is a diagram showing an outline of processing in a training phase of a damage situation analysis model.

As an example, as shown in FIG. 6, in a training phase, the damage situation analysis model 68 is trained by being given training data 75. The training data 75 is a set of a training building image 66L and a correct damage situation 69CA corresponding to the training building image 66L. The training building image 66L is obtained by inputting a bird's-eye view image of a certain area into the building image cutout unit 61. The correct damage situation 69CA is a result of actually discriminating the damage situation 69 of the building 78 appearing in the training building image 66L by a qualified person such as a house damage certified person.

In the training phase, the training building image 66L is input to the damage situation analysis model 68. The damage situation analysis model 68 outputs a training damage situation 69L to the training building image 66L. Loss calculation of the damage situation analysis model 68 using a loss function is performed based on the training damage situation 69L and the correct damage situation 69CA. Various coefficients of the damage situation analysis model 68 are update-set according to a result of the loss calculation, and the damage situation analysis model 68 is updated according to the update-setting.

In the training phase of the damage situation analysis model 68, the series of processing of the input of the training building image 66L into the damage situation analysis model 68, the output of the training damage situation 69L from the damage situation analysis model 68, the loss calculation, the update-setting, and the updating of the damage situation analysis model 68 are repeatedly performed while the training data 75 is being exchanged. The repetition of the series of processing is ended in a case where discrimination accuracy of the training damage situation 69L for the correct damage situation 69CA reaches a predetermined set level. The damage situation analysis model 68 in which the discrimination accuracy reaches the set level is stored in the storage 30 and is used by the first processing unit 62.

Figure 7:
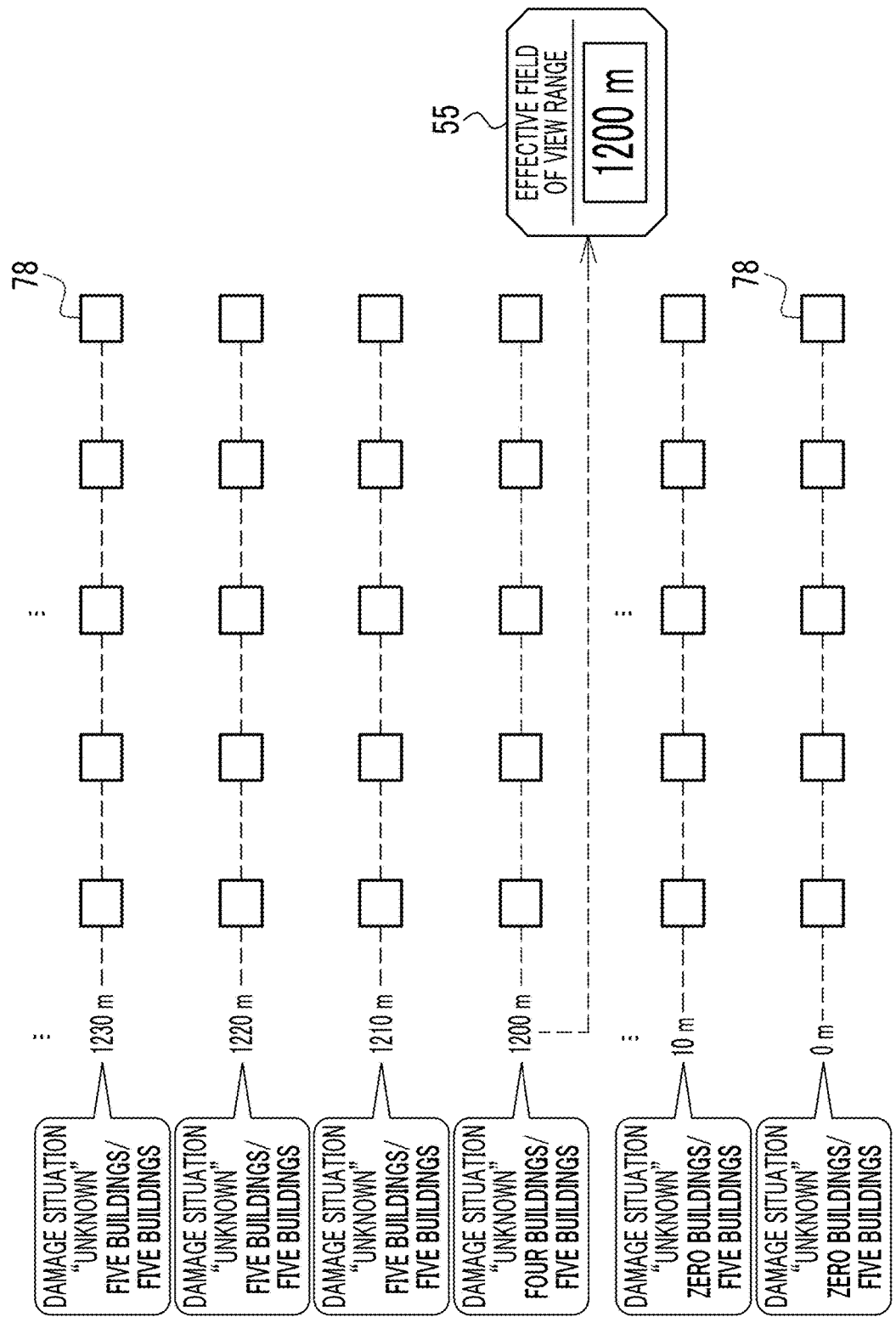
FIG. 7 is a diagram showing an example of processing of an effective field of view range determination unit.

As an example, as shown in FIG. 7, the effective field of view range determination unit 63 counts the number of buildings 78 of which the damage situation 69 is "unknown" for each distance from the surveillance camera 10. The effective field of view range determination unit 63 determines that, in a case where a distance with which the number of buildings 78 of which the damage situation 69 is "unknown" is less than 5 and then the number of buildings 78 of which the damage situation 69 is "unknown" is 5 is continuous two or more times among the distances from the surveillance camera 10, this distance is the effective field of view range 55. As in the case of FIG. 5, FIG. 7 illustrates a case where the effective field of view range 55 is determined to be "1200 m".

Figure 8:
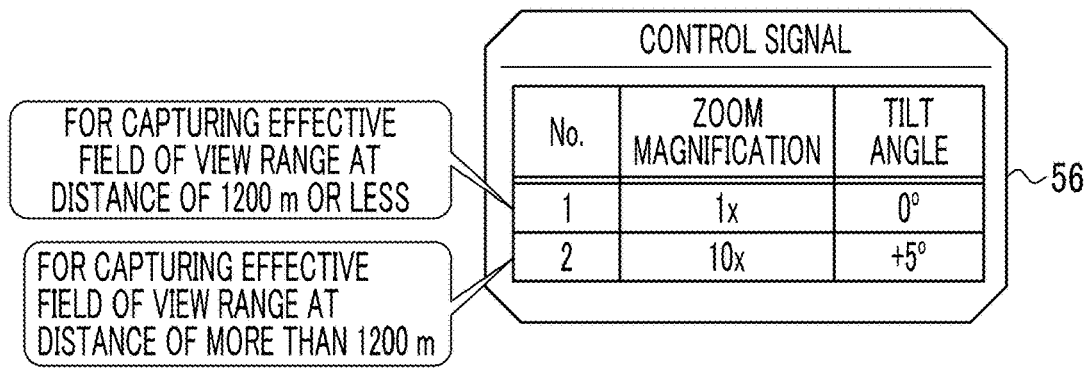
FIG. 8 is a diagram showing a control signal.

As an example, as shown in FIG. 8, in a case where the effective field of view range 55 is "1200 m" illustrated in FIG. 7, the control signal generation unit 47 generates the control signal 56 for setting the zoom magnification as 1× and the tilt angle as 0° for capturing the effective field of view range 55 in which the distance from the surveillance camera 10 is equal to or less than 1200 m. The control signal generation unit 47 generates the control signal 56 for setting the zoom magnification as 10× and the tilt angle as −5° for capturing a range in which the distance from the surveillance camera 10 is more than 1200 m.

Figure 9:
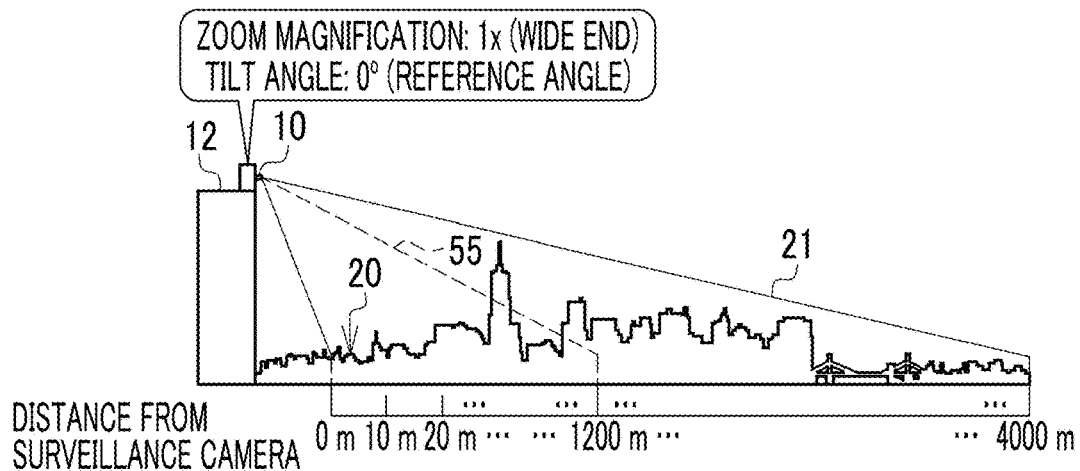
FIG. 9 is a diagram showing a scene in which a surveillance camera captures a bird's-eye view image of the area based on a control signal for setting a zoom magnification as 1× and a tilt angle as 0°.

FIG. 9 shows a scene in which the surveillance camera 10 captures the bird's-eye view image 22 of the area 20 based on the control signal 56 for setting the zoom magnification as 1× and the tilt angle as 0°. In this case, although all the buildings 78 in the imaging range 21 appear in the bird's-eye view image 22, since the effective field of view range 55 is 1200 m, buildings 78 in a range exceeding the effective field of view range 55 appear in a state where the damage situation cannot be grasped.

Figure 10:
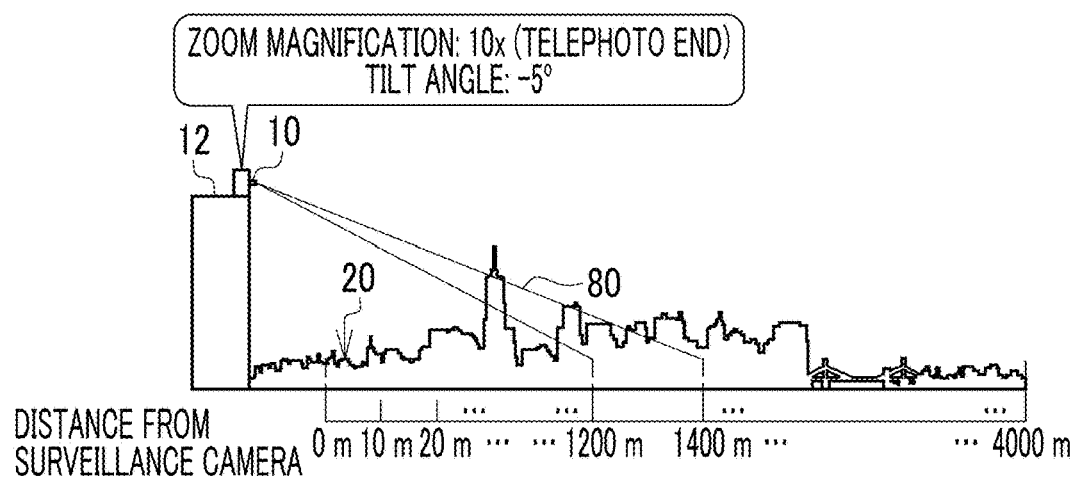
FIG. 10 is a diagram showing a scene in which the surveillance camera captures the bird's-eye view image of the area based on a control signal for setting a zoom magnification as 10 times and a tilt angle as −5°.

FIG. 10 shows a scene in which the surveillance camera 10 captures the bird's-eye view image 22 of the area 20 based on the control signal 56 for setting the zoom magnification as 10× and the tilt angle as −5°. Since the zoom magnification and the tilt angle are different, the imaging range 80 in this case is narrower than the range in the case of FIG. 9 and is a range exceeding the effective field of view range 55. Thus, in the bird's-eye view image 22 captured in this case, there is a high possibility that the buildings 78 in the range exceeding the effective field of view range 55 appear in a state where the damage situation can be grasped. Both the bird's-eye view image 22 obtained in the case of FIG. 9 and the bird's-eye view image 22 obtained in the case of FIG. 10 are stored in the storage 30, and both the bird's-eye view images 22 are output to the damage situation analysis unit 49. The analysis result 57 based on each of both the bird's-eye view images 22 is output.

Figure 11:
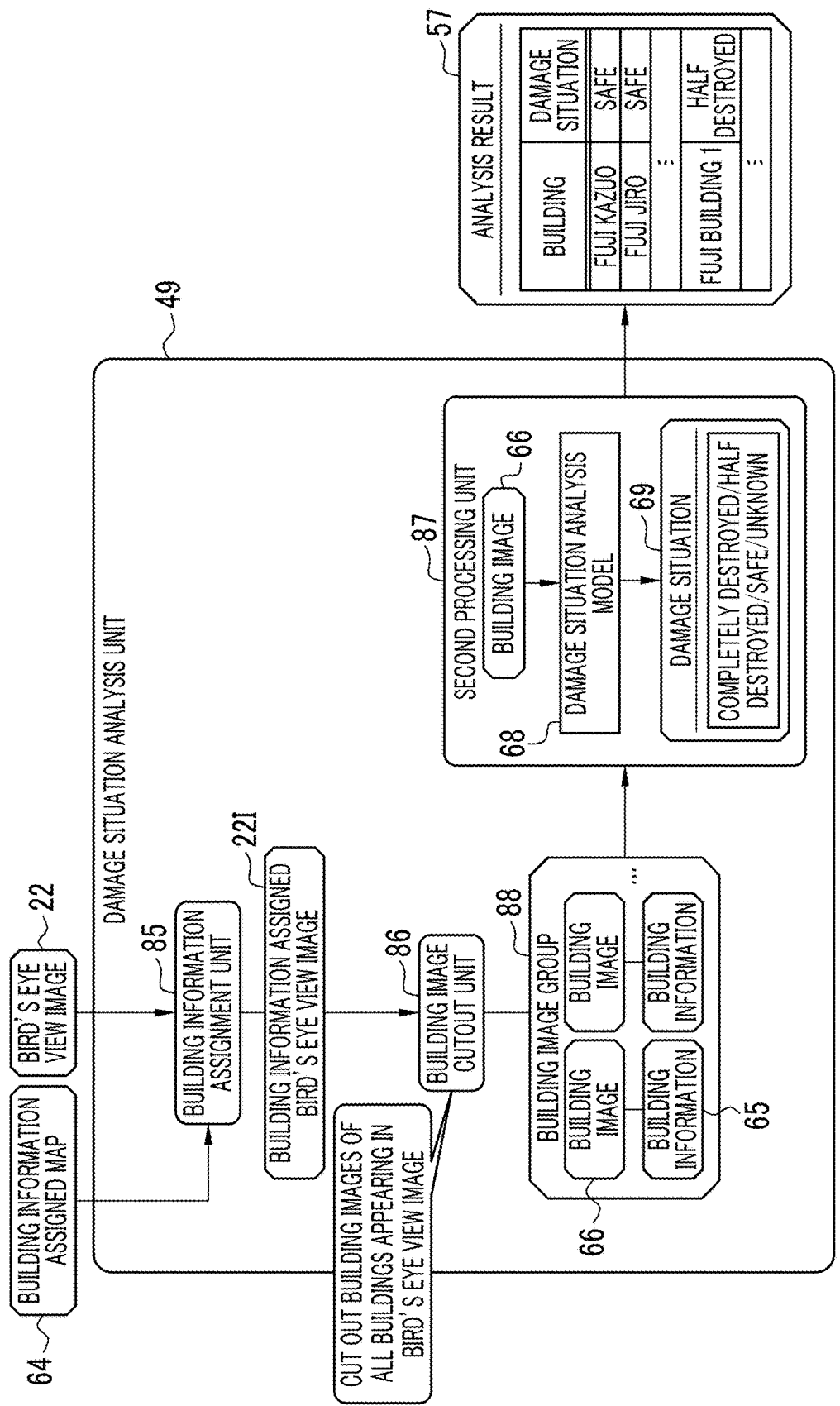
FIG. 11 is a block diagram showing details of a damage situation analysis unit.

As an example, as shown in FIG. 11, the damage situation analysis unit 49 includes a building information assignment unit 85, a building image cutout unit 86, and a second processing unit 87. Similar to the building information assignment unit 60 of the effective field of view range derivation unit 46, the building information assignment unit 85 assigns the building information 65 to each building 78 appearing in the bird's-eye view image 22 while referring to the building information assigned map 64, and uses the bird's-eye view image 22 as the building information assigned bird's-eye view image 221. The building information assignment unit 85 outputs the building information assigned bird's-eye view image 221 to the building image cutout unit 86.

Similar to the building image cutout unit 61 of the effective field of view range derivation unit 46, the building image cutout unit 86 cuts out the building images 66 from the building information assigned bird's-eye view image 221. However, the building image cutout unit 86 cuts out the building images 66 of all the buildings 78 appearing in the building information assigned bird's-eye view image 221. The building image cutout unit 86 outputs, to the second processing unit 87, a building image group 88 including the set of the building images 66 and the pieces of building information 65 of all the buildings 78.

Similar to the first processing unit 62 of the effective field of view range derivation unit 46, the second processing unit 87 inputs the building images 66 into the damage situation analysis model 68. The damage situation 69 is output from the damage situation analysis model 68. The second processing unit 87 outputs the damage situations 69 from the damage situation analysis model 68 for the building images 66 of all the buildings 78 included in the building image group 88. The second processing unit 87 outputs the analysis result 57 in which the damage situation 69 for each building 78 is summarized. FIG. 11 illustrates a case where the damage situations 69 of the buildings 78 of "Fuji Kazuo" and "Fuji Jiro" are "safe" and the damage situation 69 of the building of "Fuji Building 1" is "half destroyed".

The damage situation 69 of "Fuji Building 1" was "unknown" in the effective field of view range determination analysis result 70 shown in FIG. 5, but was "half destroyed" in FIG. 11. Such a circumstance represents from the bird's-eye view image 22 obtained in the case of FIG. 10 that the damage situation 69 of "Fuji Building 1" in a range of a distance of 1300 m exceeding the effective field of view range 55 can be discriminated as "half destroyed".

Figure 12:
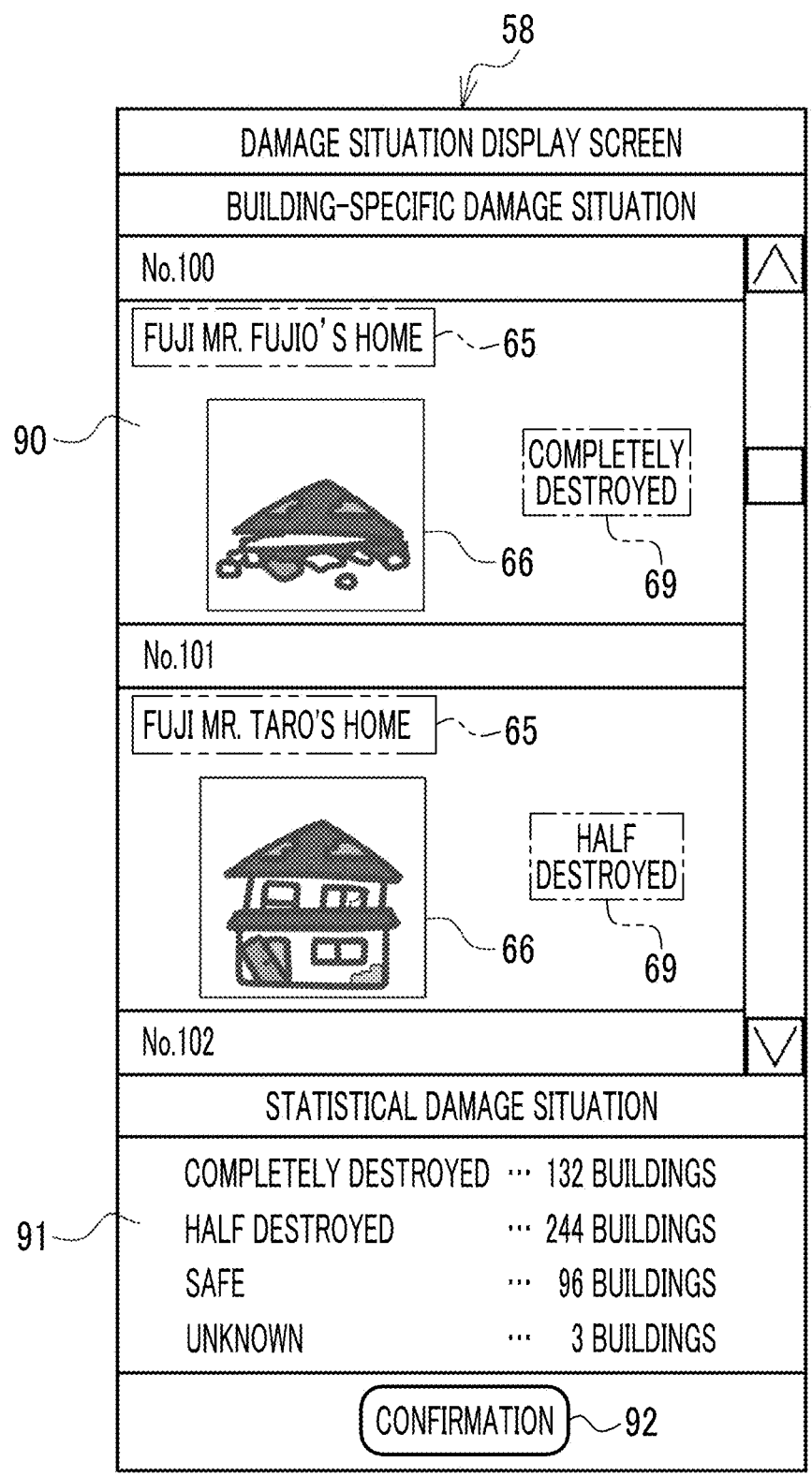
FIG. 12 is a diagram showing a damage situation display screen.

As an example, as shown in FIG. 12, the damage situation display screen 58 displayed on the display 16 of the client terminal 15 includes a building-specific damage situation display region 90 and a statistical damage situation display region 91. The building information 65, the building image 66, and the damage situation 69 of each building are displayed in the building-specific damage situation display region 90. In the statistical damage situation display region 91, the total number of each of completely destroyed, half destroyed, safe, and unknown buildings 78 of the area 20 is displayed. In a case where a confirmation button 92 is selected, the display of the damage situation display screen 58 is erased.

Next, actions of the above configuration will be described with reference to the flowcharts of FIGS. 13 and 14. First, in a case where the operation program 40 is started in the disaster information processing server 11, as shown in FIG. 4, the CPU 32 of the disaster information processing server 11 functions as the RW control unit 45, the effective field of view range derivation unit 46, the control signal generation unit 47, the transmission control unit 48, the damage situation analysis unit 49, and the screen distribution control unit 50. As shown in FIG. 5, the effective field of view range derivation unit 46 includes the building information assignment unit 60, the building image cutout unit 61, the first processing unit 62, and the effective field of view range determination unit 63. As shown in FIG. 11, the damage situation analysis unit 49 includes the building information assignment unit 85, the building image cutout unit 86, and the second processing unit 87.

The bird's-eye view image 22 of the area 20 where the disaster has occurred is transmitted from the surveillance camera 10 to the disaster information processing server 11. As an example, as shown in FIG. 13, in the disaster information processing server 11, the bird's-eye view image 22 is received by the RW control unit 45 (step ST100). The bird's-eye view image 22 is stored in the storage 30 by the RW control unit 45 in response to an instruction from the staff member of the disaster response headquarters.

In a case where a processing request (not shown) from the client terminal 15 is received, the bird's-eye view image 22 is read out from the storage 30 by the RW control unit 45, and the read-out bird's-eye view image 22 is output from the RW control unit 45 to the effective field of view range derivation unit 46. As shown in FIGS. 5 and 7, the effective field of view range 55 in the bird's-eye view image 22 is derived by the effective field of view range derivation unit 46 (step ST110). The effective field of view range 55 is output from the effective field of view range derivation unit 46 to the control signal generation unit 47.

The control signal 56 shown in FIG. 8 is generated by the control signal generation unit 47 based on the effective field of view range 55 (step ST120). The control signal 56 is output from the control signal generation unit 47 to the transmission control unit 48. The control signal 56 is transmitted to the surveillance camera 10 by the transmission control unit 48 (step ST130).

In the surveillance camera 10, an operation is controlled according to the control signal 56 as shown in FIGS. 9 and 10. The bird's-eye view image 22 in the state shown in FIGS. 9 and 10 is stored in the storage 30 by the RW control unit 45 in response to an instruction from the staff member of the disaster response headquarters.

As an example, as shown in FIG. 14, in a case where a distribution request from the client terminal 15 is received, the bird's-eye view image 22 is read out from the storage 30 by the RW control unit 45, and the read-out bird's-eye view image 22 is output from the RW control unit 45 to the damage situation analysis unit 49. As shown in FIG. 11, the damage situation 69 for each building 78 of the area 20 is analyzed by using the bird's-eye view image 22 in the damage situation analysis unit 49 (step ST200). The analysis result 57 of the damage situation 69 is output from the damage situation analysis unit 49 to the screen distribution control unit 50.

The damage situation display screen 58 shown in FIG. 12 is generated by the screen distribution control unit 50 based on the analysis result 57. The screen data of the damage situation display screen 58 is distributed to the client terminal 15 of a distribution request source by the screen distribution control unit 50 (step ST210). The damage situation display screen 58 is displayed on the display 16 of the client terminal 15 of the distribution request source, and is used for viewing by the staff member of the disaster response headquarters.

As described above, the CPU 32 of the disaster information processing server 11 comprises the effective field of view range derivation unit 46 and the control signal generation unit 47. The effective field of view range derivation unit 46 derives and acquires the effective field of view range 55 in the bird's-eye view image 22 of the area 20 captured by the surveillance camera 10, and is the effective field of view range 55 in which the damage situation 69 of the area 20 can be grasped and which changes depending on the environmental conditions of the area 20. The control signal generation unit 47 generates a control signal 56 of the surveillance camera 10 corresponding to the effective field of view range 55. An operation of the surveillance camera 10 is controlled by the control signal 56. Accordingly, it is possible to control the operation of the surveillance camera 10 suitable for the environmental conditions of the area 20.

As shown in FIGS. 8 to 10, the control signal generation unit 47 generates a control signal 56 that sets the zoom magnification of the surveillance camera 10 and the tilt angle of the surveillance camera 10 based on the effective field of view range 55. Thus, there is an increased possibility that the building 78 whose damage situation 69 is "unknown" in the default setting where the zoom magnification is the same magnification and the tilt angle is 0° can be included in the bird's-eye view image 22 with relatively high image quality. It is possible to reduce the number of buildings 78 whose damage situation 69 is "unknown".

The effective field of view range derivation unit 46 derives the effective field of view range 55 from the bird's-eye view image 22 captured in real time by the surveillance camera 10. Thus, it is possible to acquire the effective field of view range 55 suitable for a current environmental condition of the area 20, and to control the operation of the surveillance camera 10 that is better adapted to the current environmental condition of the area 20.

The damage situation analysis unit 49 analyzes the damage situation 69 for each building 78 in the area 20 by using the bird's-eye view image 22. Thus, it is possible to easily grasp the damage situation 69 of the building 78 without performing a complicated investigation of actually walking around the area 20.

The control signal 56 is not limited to the contents illustrated in FIG. 8. As an example, as shown in FIG. 15, in a case where the effective field of view range 55 is, for example, 1200 m, the control signal 56 for setting the zoom magnification as 1× and the tilt angle as −20° for imaging of the effective field of view range 55 having a distance of 1200 m or less from the surveillance camera 10 may be generated.

Figure 16:
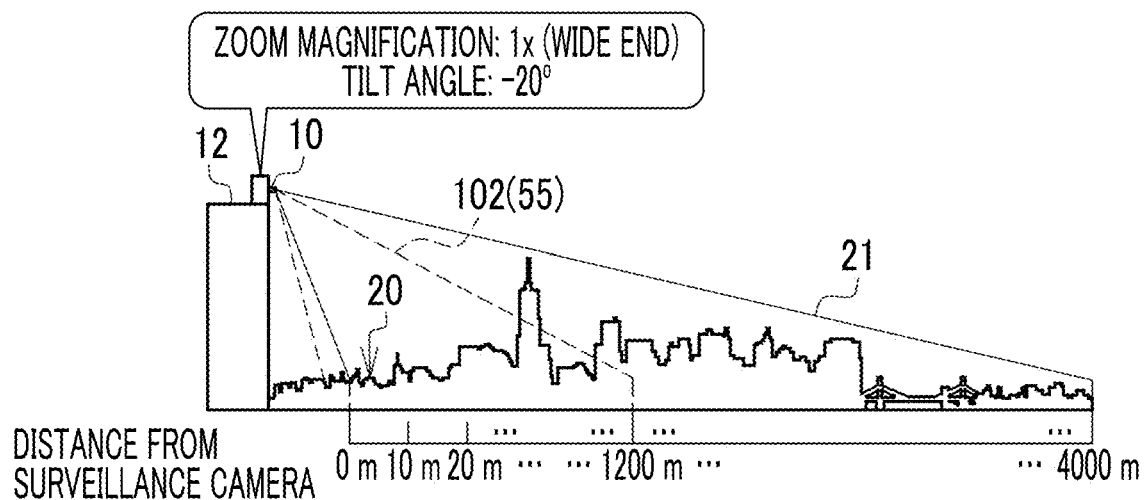
FIG. 16 is a diagram showing a scene in which the surveillance camera captures the bird's-eye view image of the area based on the control signal shown in FIG. 15.

FIG. 16 shows a scene in which the surveillance camera 10 captures a bird's-eye view image 22 of the area 20 based on the control signal 56 of FIG. 15 for setting the zoom magnification as 1× and the tilt angle as −20°. In this case, the imaging range 102 is substantially the same as the effective field of view range 55. Thus, the bird's-eye view image 22 captured in this case does not show the buildings 78 in a range exceeding the effective field of view range 55, but only shows the buildings 78 existing in the effective field of view range 55.

As described above, according to the control signal 56 in which the imaging range 102 of the surveillance camera 10 is set to substantially the same range as the effective field of view range 55, the range exceeding the effective field of view range 55 in which the probability that the damage situation is "unknown" is very high is extremely high. The building 78 is not shown in the bird's-eye view image 22. Accordingly, it is possible to reduce a processing load of the damage situation analysis unit 49 for the buildings 78 in the range exceeding the effective field of view range 55.

Figure 17:
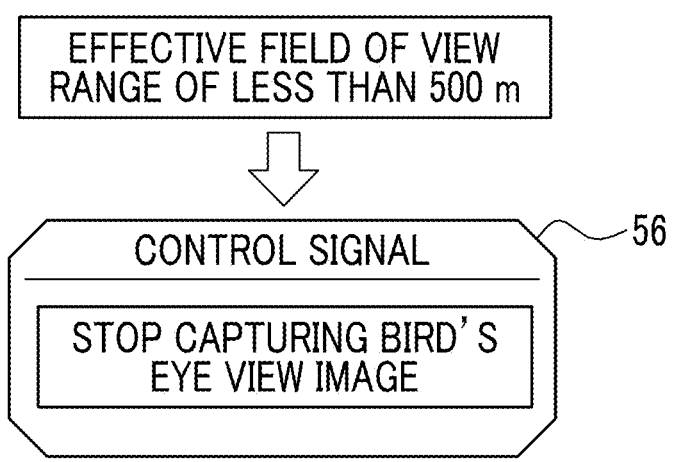
FIG. 17 is a diagram showing still another example of the control signal.

The control signal 56 may have contents shown in FIG. 17. The control signal 56 shown in FIG. 17 has contents for causing the surveillance camera 10 to stop the capturing of the bird's-eye view image 22 in a case where the effective field of view range 55 is less than a preset threshold value, for example, less than 500 m. A value considered to have no significant advantage even though the damage situation 69 is analyzed based on the bird's-eye view image 22 in the effective field of view range 55 as compared with a case where the damage situation is manually analyzed is set as the threshold value.

In a case where the effective field of view range 55 is less than the threshold value, according to the control signal 56 causing the surveillance camera 10 to stop the capturing of the bird's-eye view image 22, the surveillance camera 10 may not perform unnecessary capturing.

The machine learning model used in the building image cutout unit 61 may be a model that outputs an evaluation value of image quality of the building 78 appearing in the building image 66 in addition to the building image 66. The effective field of view range 55 may be determined based on whether or not the building image 66 in which the evaluation value of the image quality of the building 78 is more than or equal to a preset threshold value can be cut out. Specifically, a distance in front of a distance with which only the building image 66 in which the evaluation value of the image quality of the building 78 is less than the threshold value can be cut out is determined as the effective field of view range 55.

A landmark building and a distance thereof may be registered in advance, and the effective field of view range 55 may be determined based on the damage situation 69 for the building image 66 from which the landmark building is cut out.

Second Embodiment

In the first embodiment, although the effective field of view range derivation unit 46 derives the effective field of view range 55 from the bird's-eye view image 22 captured in real time by the surveillance camera 10, the disclosed technology is not limited thereto. As in the second embodiment shown in FIG. 18, effective field of view ranges 55 corresponding to environmental conditions of a plurality of patterns may be stored in advance.

Figure 18:
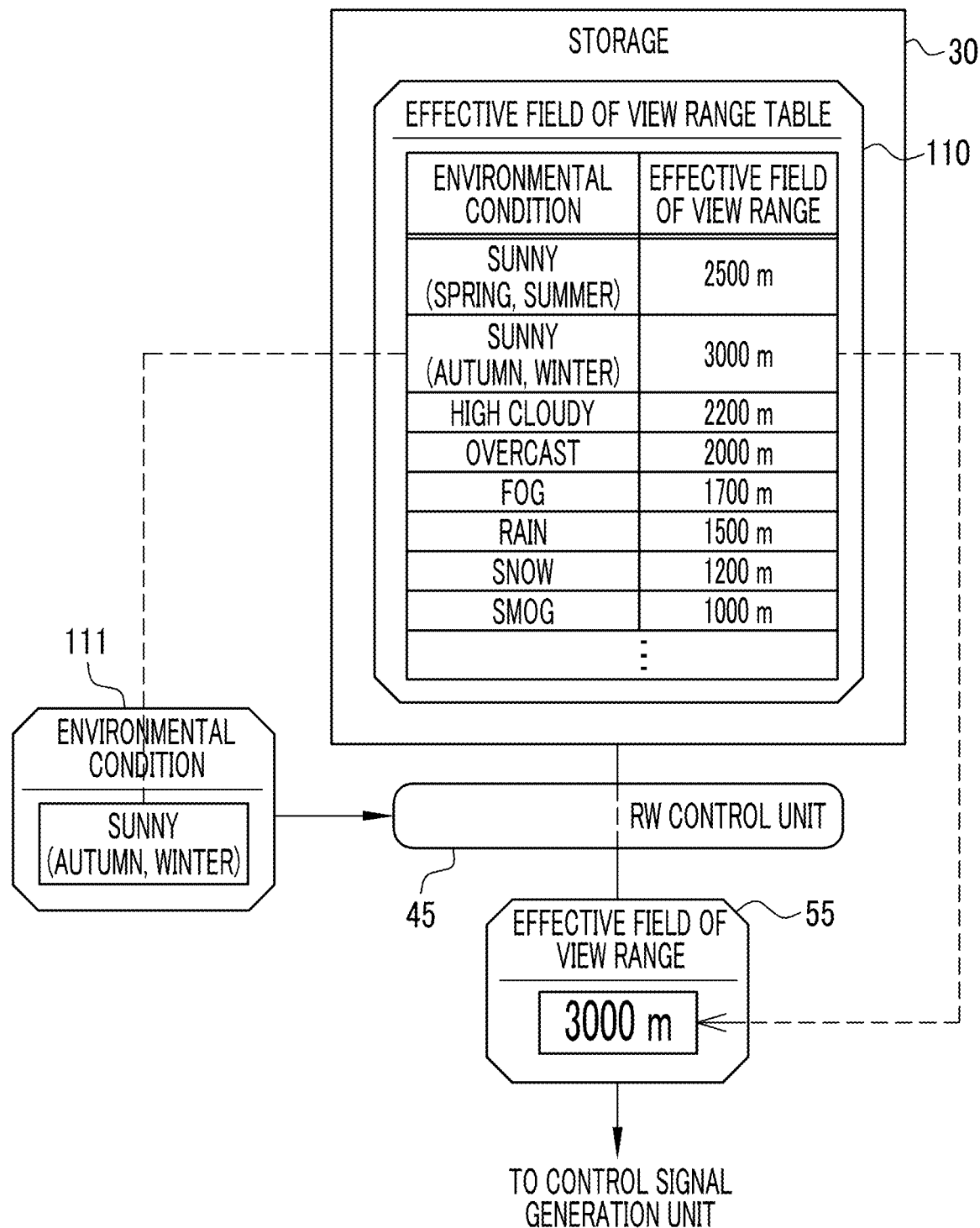
FIG. 18 is a diagram showing a second embodiment in which effective field of view ranges corresponding to environmental conditions of a plurality of patterns are stored in advance.

As an example, as shown in FIG. 18, in the second embodiment, an effective field of view range table 110 is stored in advance in the storage 30. The effective field of view range table 110 is a table in which the effective field of view range 55 for each environmental condition is registered. The environmental conditions include "sunny (spring, summer)", "sunny (autumn, winter)", "overcast", "rain", "snow", "smog", and the like. Spring and summer are, for example, March to September, and autumn and winter are, for example, October to February. In the effective field of view range 55, for example, "2500 m" is registered in the case of "sunny (spring, summer)", "3000 m" is registered in the case of "sunny (autumn, winter)", and "2000 m" is registered in the case of "overcast". For example, the effective field of view ranges 55 are derived from the bird's-eye view images 22 actually captured multiple times before the occurrence of the disaster in each environmental condition as in the effective field of view range derivation unit 46 of the first embodiment, and the effective field of view range 55 is obtained as an average value thereof.

The RW control unit 45 receives a current environmental condition 111 of the area 20. The RW control unit 45 acquires the effective field of view ranges 55 corresponding to the received environmental condition 111 by reading out the effective field of view ranges from the effective field of view range table 110 of the storage 30. The RW control unit 45 outputs the effective field of view range 55 to the control signal generation unit 47. Since subsequent processing is similar to the processing of the first embodiment, the description thereof will be omitted. In FIG. 18, a case where the environmental condition 111 is "sunny (autumn, winter)" and "3000 m" is read out as the effective field of view range 55 is illustrated. The environmental condition 111 may be input by the staff member of the disaster response headquarters or may be received from a public institution such as the Meteorological Agency via the network 14.

As described above, in the second embodiment, the effective field of view ranges 55 corresponding to the environmental conditions of the plurality of patterns are stored in advance in the storage 30, and the RW control unit 45 acquires the effective field of view range 55 by reading out the effective field of view range corresponding to the current environmental condition 111 of the area 20 from the storage 30. Thus, it is possible to save time and effort for deriving the effective field of view range 55 from the bird's-eye view image 22 as in the first embodiment.

As the environmental condition for storing the effective field of view range 55 in the effective field of view range table 110, "yellow sand scattering", "pollen scattering", "tropical day", "extremely hot day", and the like may be added. Similar to "smog", in the cases of "yellow sand scattering" and "pollen scattering", the effective field of view range 55 is narrowed due to an influence of fine particles scattered in the air. In the cases of "tropical day" and "extremely hot day", a distance looks hazy due to an influence of heat haze.

Third Embodiment

In each of the above-described embodiments, although a case where the number of surveillance cameras 10 is one has been illustrated, the disclosed technology is not limited thereto. As in a third embodiment shown in FIG. 19 and FIG. 20, a plurality of surveillance cameras 10 may be provided.

Figure 19:
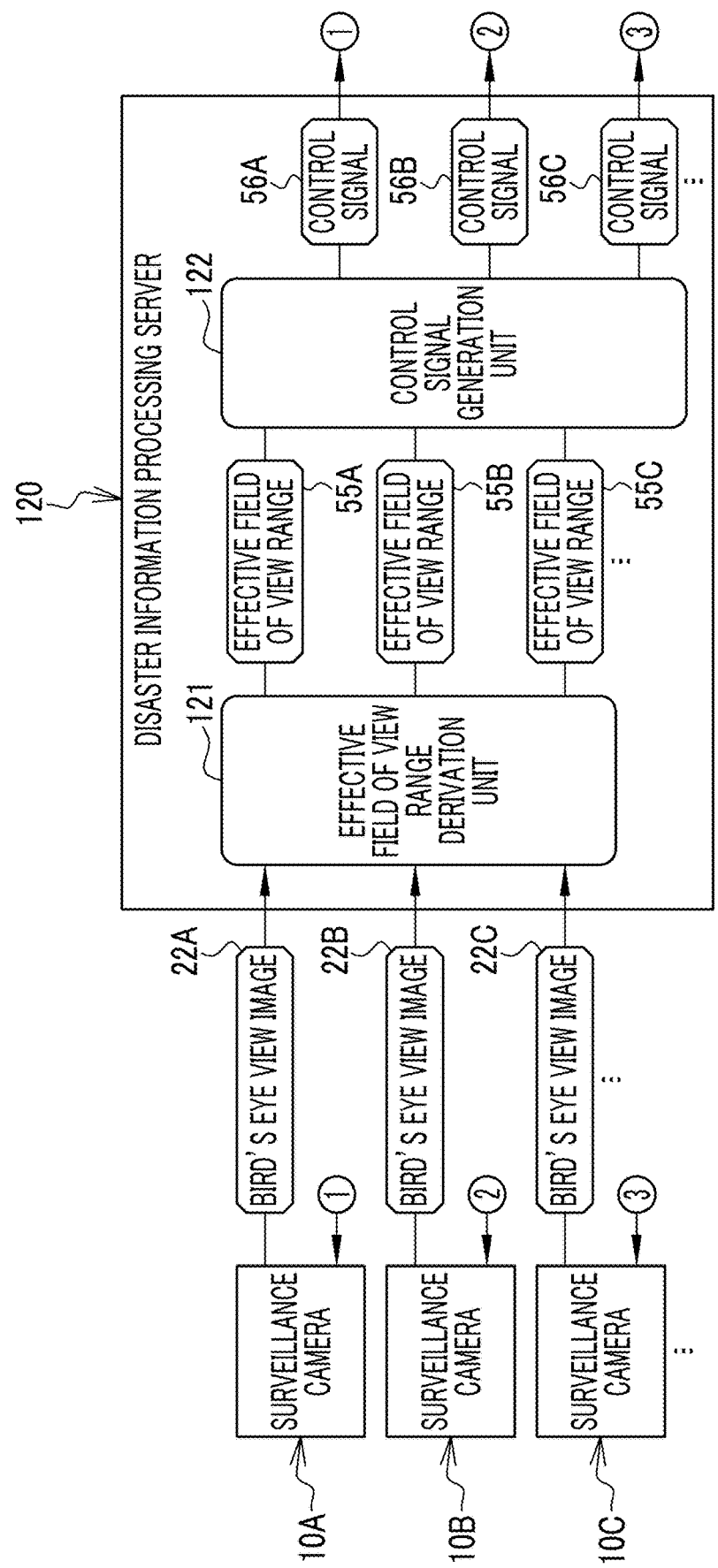
FIG. 19 is a diagram showing a third embodiment in which a plurality of surveillance cameras are used.

As an example, as shown in FIG. 19, a plurality of surveillance cameras 10A, 10B, 10C, . . . are connected to a disaster information processing server 120 of the present embodiment. The disaster information processing server 120 receives a bird's-eye view image 22A from the surveillance camera 10A, a bird's-eye view image 22B from the surveillance camera 10B, a bird's-eye view image 22C from the surveillance camera 10C, . . . . An effective field of view range derivation unit 121 derives an effective field of view range 55A in the bird's-eye view image 22A, an effective field of view range 55B in the bird's-eye view image 22B, an effective field of view range 55C in the bird's-eye view image 22C, . . . . A control signal generation unit 122 generates a control signal 56A corresponding to the effective field of view range 55A, a control signal 56B corresponding to the effective field of view range 55B, a control signal 56C corresponding to the effective field of view range 55C, . . . . The control signal 56A is transmitted to the surveillance camera 10A, the control signal 56B is transmitted to the surveillance camera 10B, the control signal 56C is transmitted to the surveillance camera 10C, . . . .

Figure 20:
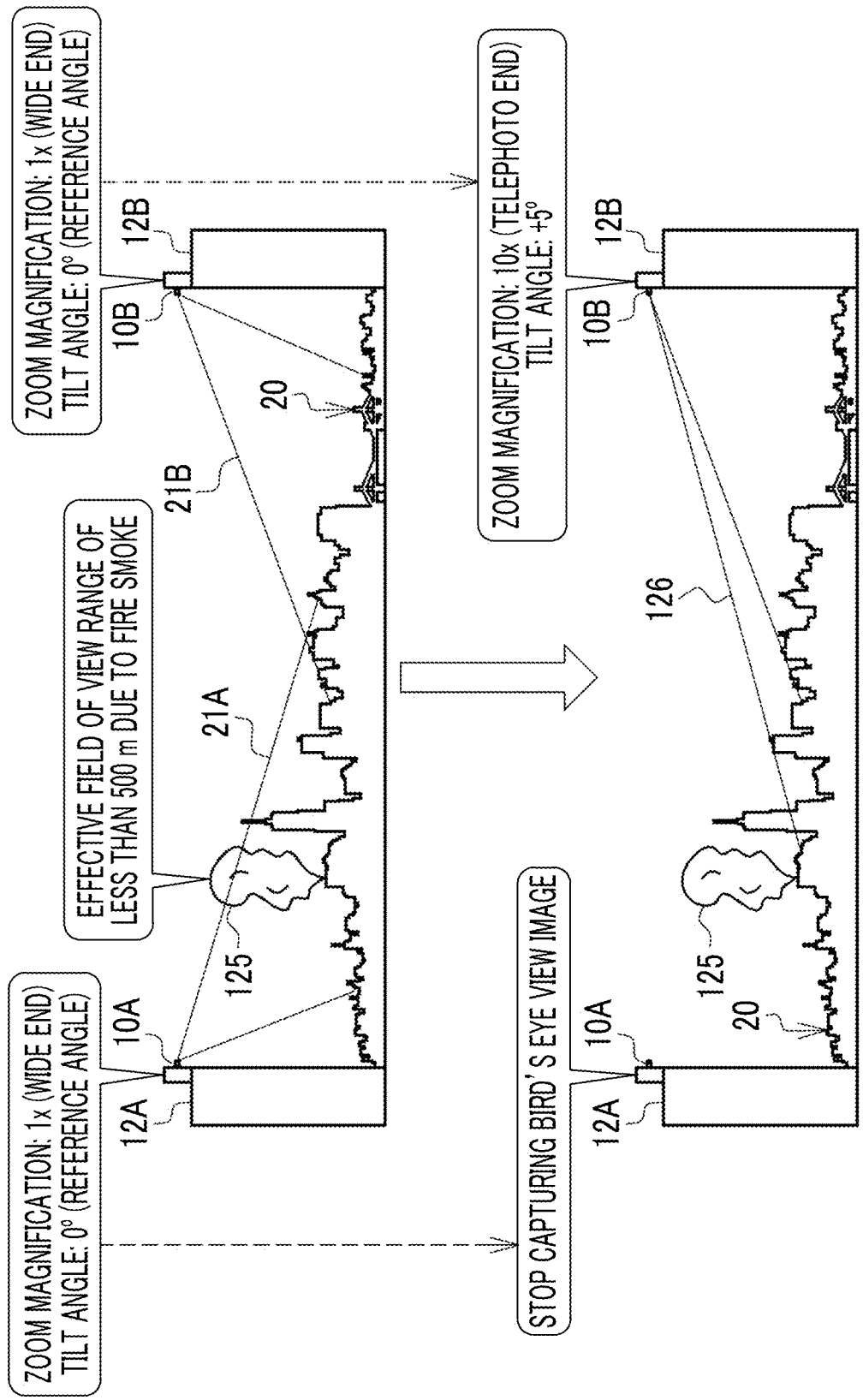
FIG. 20 is a diagram showing a specific example in which an operation of each of the plurality of surveillance cameras is controlled.

FIG. 20 shows a specific example in which an operation of each of the plurality of surveillance cameras 10 is controlled. In FIG. 20, for the sake of simplicity, an aspect in which the operation of each of the two surveillance cameras 10A and 10B is controlled is shown. Incidentally, the surveillance camera 10A is installed on a roof of a high-rise building 12A, and the surveillance camera 10B is installed on a roof of a high-rise building 12B facing the high-rise building 12A.

As shown in an upper part of the arrow, first, the surveillance camera 10A captures the bird's-eye view image 22A of a default imaging range 21A based on the control signal 56A for setting the zoom magnification as 1× and the tilt angle as 0°. Similarly, the surveillance camera 10B also captures the bird's-eye view image 22B of a default imaging range 21B based on the control signal 56B for setting the zoom magnification as 1× and the tilt angle as 0°.

Here, a case where the effective field of view range 55A of the bird's-eye view image 22A by the surveillance camera 10A is less than 500 m due to fire smoke 125 is considered. In this case, as shown in a lower part of the arrow, the control signal generation unit 122 generates the control signal 56A having contents for causing the surveillance camera 10A to stop the capturing of the bird's-eye view image 22A. The control signal generation unit 122 generates the control signal 56B for setting the zoom magnification of the camera 10B as 10× and the tilt angle as −5° in order to include the building 78 which is out of the effective field of view range 55B of the bird's-eye view image 22B by the surveillance camera 10B and is the building 78 directly under the fire smoke 125 in the bird's-eye view image 22B.

As described above, in the third embodiment, the plurality of surveillance cameras 10 are provided, and the control signal generation unit 122 generates the control signal 56 for controlling the operation of each of the plurality of surveillance cameras 10 based on the effective field of view range 55 of each of the plurality of surveillance cameras 10. Thus, as shown in FIG. 20, the plurality of surveillance cameras 10 can capture the bird's-eye view images 22 to cover a range that cannot be covered by one surveillance camera 10 with the other surveillance camera 10 in cooperation with each other.

In addition to the example shown in FIG. 20, an example in which the operation of each of the plurality of surveillance cameras 10 is controlled can be considered as follows. For example, in a case where the effective field of view ranges 55 of the bird's-eye view images 22 by all the surveillance cameras 10 are less than a threshold value due to bad weather such as heavy fog or heavy rain, the control signal 56 having contents for causing all the surveillance cameras 10 to stop the capturing of the bird's-eye view images 22 is generated, and the capturing of the bird's-eye view image 22 of all the surveillance cameras 10 is stopped.

Fourth Embodiment

In the first embodiment, although the damage situation 69 is analyzed based only on the bird's-eye view image 22 captured by one surveillance camera 10, the disclosed technology is not limited thereto. As in the fourth embodiment shown in FIGS. 21 and 22, the damage situation may be analyzed based on the bird's-eye view images 22 captured by the plurality of surveillance cameras 10. Hereinafter, for the sake of simplification, a case where two surveillance cameras 10A and 10B are used will be illustrated as in the case of FIG. 20. The imaging ranges of the surveillance cameras 10A and 10B at least partially overlap each other, and the same building 78 is captured in different aspects in the bird's-eye view image 22A and the bird's-eye view image 22B.

Figure 21:
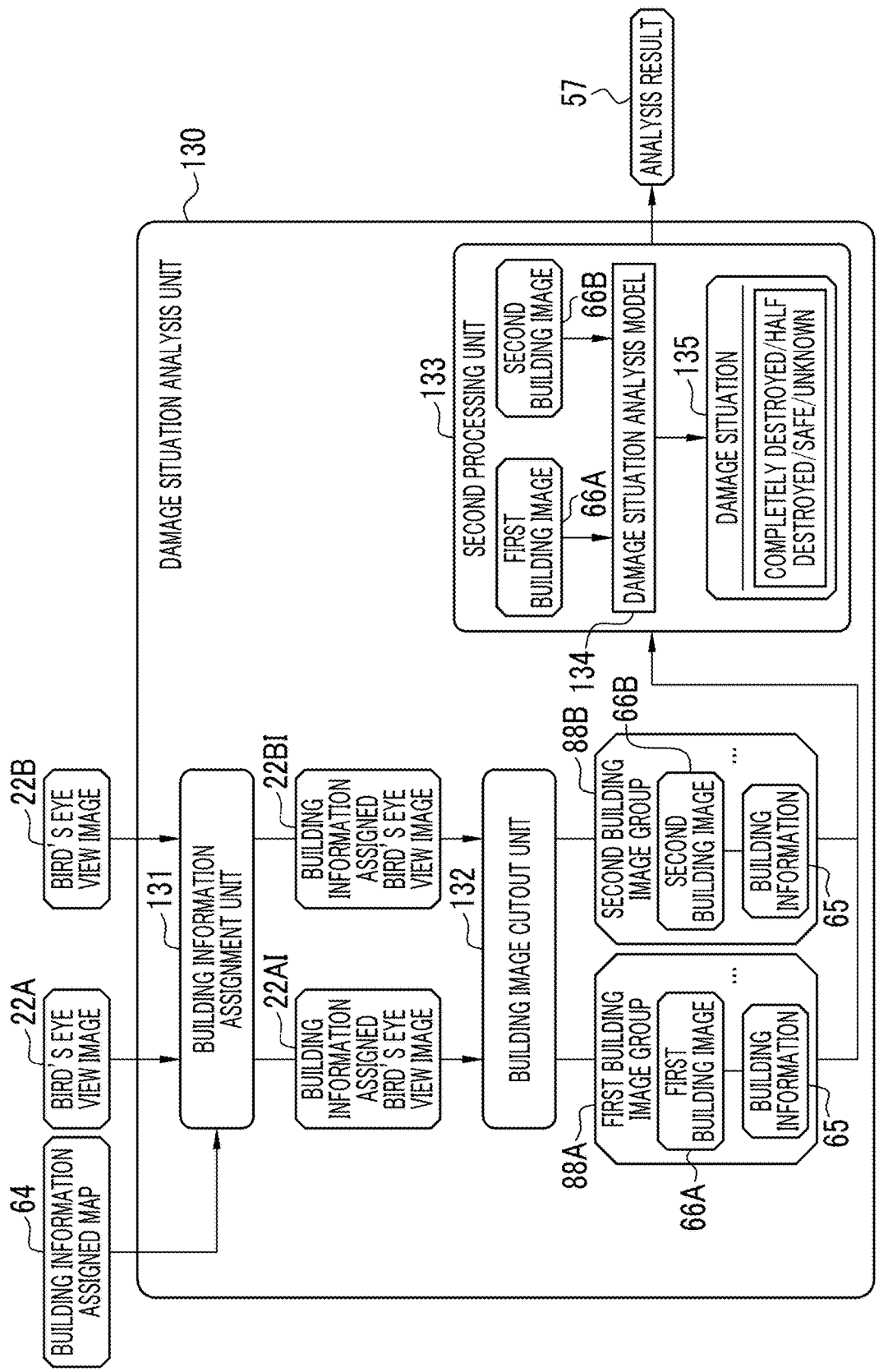
FIG. 21 is a block diagram showing details of a damage situation analysis unit according to a fourth embodiment.

As an example, as shown in FIG. 21, a building information assignment unit 131 of a damage situation analysis unit 130 of the fourth embodiment assigns the building information 65 to each building 78 appearing in the bird's-eye view image 22A by the surveillance camera 10A while referring to the building information assigned map 64 similar to the building information assignment unit 85 of the first embodiment, and uses the bird's-eye view image 22A as a building information assigned bird's-eye view image 22AI. The building information assignment unit 131 also assigns the building information 65 to each building 78 appearing in the bird's-eye view image 22B by the surveillance camera 10B, and uses the bird's-eye view image 22B as a building information assigned bird's-eye view image 22BI. A building image cutout unit 132 cuts out a first building image 66A from the building information assigned bird's-eye view image 22AI and cuts out a second building image 66B from the building information assigned bird's-eye view image 22BI. The building image cutout unit 132 outputs, to a second processing unit 133, a first building image group 88A including a plurality of sets of the first building image 66A and the building information 65, and a second building image group 88B including a plurality of sets of the second building image 66B and the building information 65.

The second processing unit 133 inputs the first building image 66A and the second building image 66B with which the same building information 65 is associated into a damage situation analysis model 134. The damage situation 135 is output from the damage situation analysis model 134. Similar to the damage situation 69 of the first embodiment, the damage situation 135 is any one of "completely destroyed", "half destroyed", "safe", or "unknown". The second processing unit 133 outputs the damage situation 135 from the damage situation analysis model 134 for all the first building images 66A and the second building images 66B which are included in the first building image group 88A and the second building image group 88B and with which the same building information 65 is associated. The first building image 66A and the second building image 66B with which the same building information 65 is not associated are input to the damage situation analysis model 68 of the first embodiment to output the damage situation 69.

Figure 22:
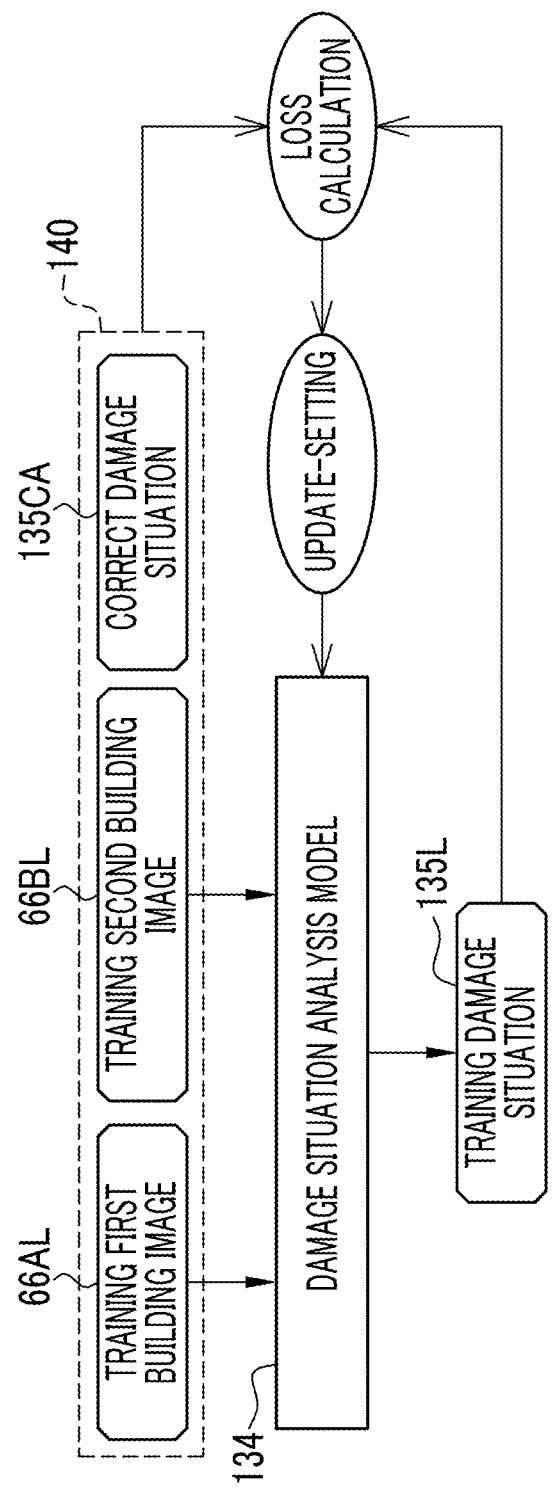
FIG. 22 is a diagram showing an outline of processing in a training phase of a damage situation analysis model of the fourth embodiment.

As an example, as shown in FIG. 22, in the training phase, the damage situation analysis model 134 is trained by being given training data 140. The training data 140 is a set of a training first building image 66AL, a training second building image 66BL, and a correct damage situation 135CA corresponding to the training first building image 66AL and the training second building image 66BL. The training first building image 66AL is obtained by inputting a bird's-eye view image of a certain area captured by a certain surveillance camera into the building image cutout unit 132. The training second building image 66BL is obtained by inputting a bird's-eye view image of a certain area captured by another surveillance camera into the building image cutout unit 132. The correct damage situation 135CA is a result of actually discriminating the damage situations 135 of the buildings 78 appearing in the training first building image 66AL and the training second building image 66BL by a qualified person such as a house damage certified person.

In the training phase, the training first building image 66AL and the training second building image 66BL are input to the damage situation analysis model 134. The damage situation analysis model 134 outputs a training damage situation 135L to the training first building image 66AL and the training second building image 66BL. Loss calculation of the damage situation analysis model 134 using a loss function is performed based on the training damage situation 135L and the correct damage situation 135CA. Various coefficients of the damage situation analysis model 134 are update-set according to a result of the loss calculation, and the damage situation analysis model 134 is updated according to the update-setting.

In the training phase of the damage situation analysis model 134, the series of processing of the input of the training first building image 66AL and the training second building image 66BL into the damage situation analysis model 134, the output of the training damage situation 135L from the damage situation analysis model 134, the loss calculation, the update-setting, and the updating of the damage situation analysis model 134 are repeatedly performed while the training data 140 is being exchanged. The repetition of the series of processing is ended in a case where discrimination accuracy of the training damage situation 135L for the correct damage situation 135CA reaches a predetermined set level. The damage situation analysis model 134 in which the discrimination accuracy reaches the set level is stored in the storage 30 and is used by the second processing unit 133.

As described above, in the fourth embodiment, in a case where the building 78 as an analysis target of the damage situation 135 is captured by the plurality of surveillance cameras 10, the damage situation analysis unit 130 analyzes the damage situation 135 of the building 78 as the analysis target by using the bird's-eye view image 22 captured by each of the plurality of surveillance cameras 10. Thus, there is a high possibility that the damage situation 135 of the building 78 which is not clear only from the bird's-eye view image 22 captured by one surveillance camera 10 can be grasped, and as a result, reliability of the analysis result 57 can be improved.

The number of surveillance cameras 10 is not limited to two. Accordingly, both the building image 66 input to the damage situation analysis model 134 and the building image 66 cut out from the bird's-eye view images 22 captured by each of three or more surveillance cameras 10 may be used.

Fifth Embodiment

Figure 23:
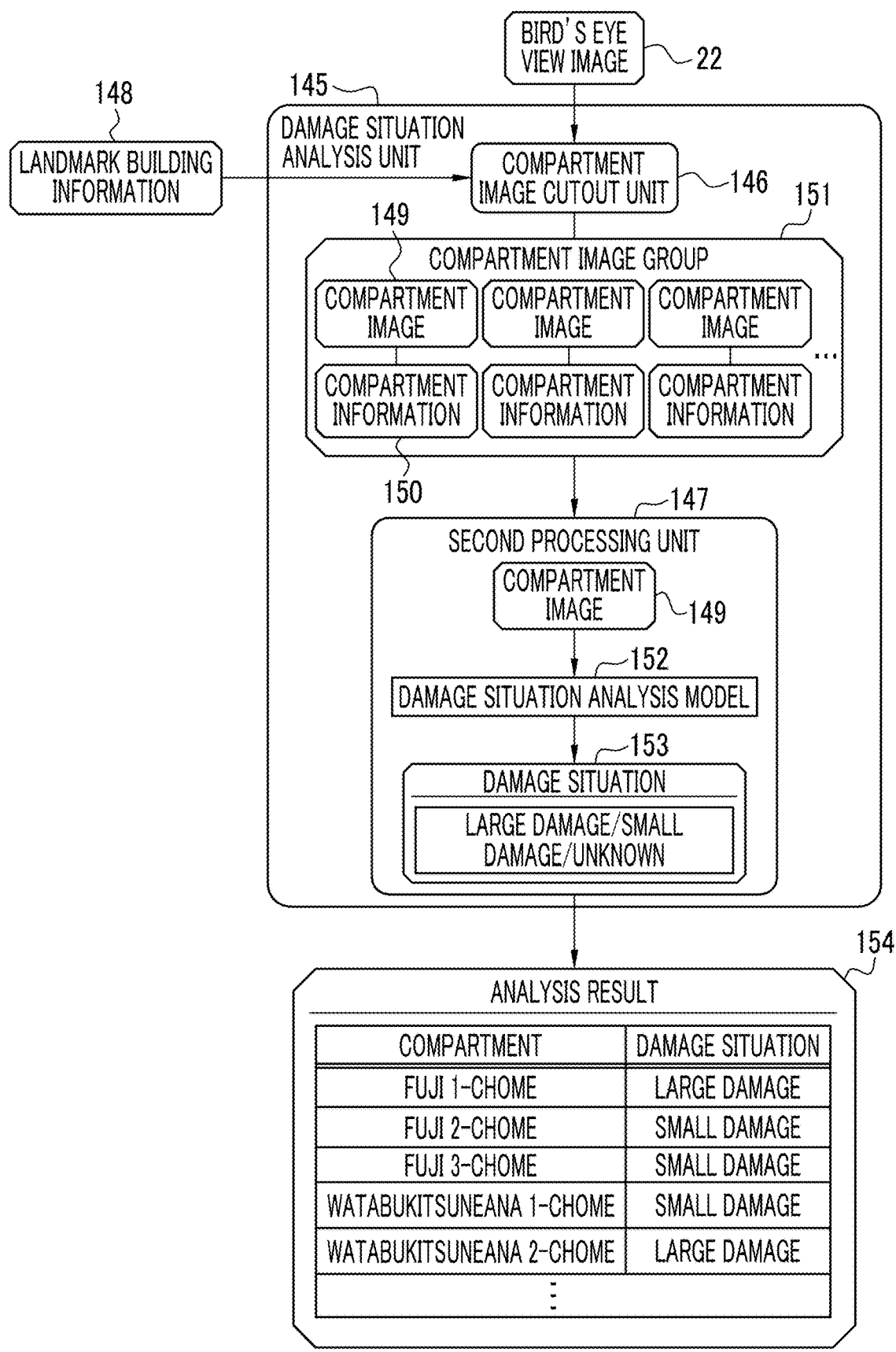
FIG. 23 is a block diagram showing details of a damage situation analysis unit according to a fifth embodiment.
Figure 24:
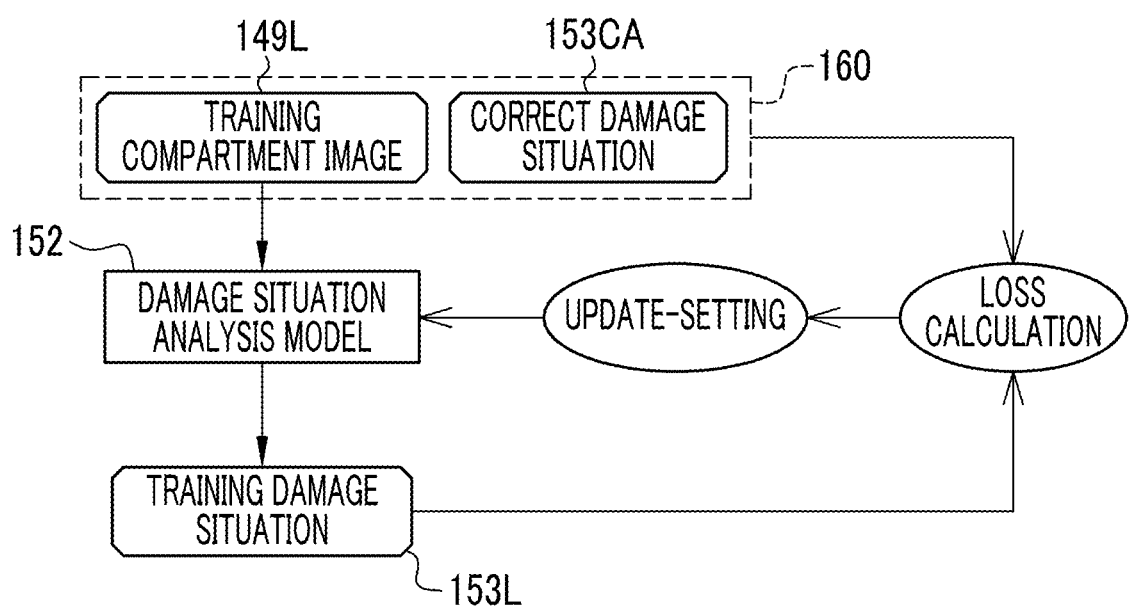
FIG. 24 is a diagram showing an outline of processing in a training phase of a damage situation analysis model of the fifth embodiment.

In a fifth embodiment shown in FIG. 23 and FIG. 24, the damage situation is analyzed not for each building 78 but for each compartment.

As an example, as shown in FIG. 23, a damage situation analysis unit 145 of the fifth embodiment includes a compartment image cutout unit 146 and a second processing unit 147. The compartment image cutout unit 146 cuts out a compartment image 149 for each compartment from the bird's-eye view image 22 while referring to landmark building information 148. The compartment is a plurality of regions obtained by dividing the area 20, and is a region including a plurality of adjacent buildings 78 of the area 20. In the present example, the compartment is a chome such as "Fuji 1-chome" or "Watabukitsuneana 2-chome". The compartment image cutout unit 146 outputs, to the second processing unit 147, a compartment image group 151 including a plurality of sets of the compartment image 149 and compartment information 150 representing a compartment of the compartment image 149.

The landmark building information 148 is stored in the storage 30, is read out from the storage 30 by the RW control unit 45, and is output to the compartment image cutout unit 146. The landmark building information 148 includes images of landmark buildings which are buildings 78 positioned at a corner of each compartment, and compartment information 150 of a compartment to which the landmark buildings belong. The compartment image cutout unit 146 finds landmark buildings from the bird's-eye view image 22 by using a well-known image recognition technology and relying on the images of the landmark buildings. A region surrounded by a line connecting the found landmark buildings is cut out as the compartment image 149 from the bird's-eye view image 22.

The second processing unit 147 inputs the compartment image 149 into a damage situation analysis model 152. A damage situation 153 is output from the damage situation analysis model 152. The damage situation 153 is any one of "large damage", "small damage", or "unknown". The second processing unit 147 outputs the damage situation 153 from the damage situation analysis model 152 for all the compartment images 149 included in the compartment image group 151. The second processing unit 147 outputs an analysis result 154 in which the damage situation 153 for each compartment is summarized. FIG. 23 illustrates a case where the damage situations 153 of the compartments such as "Fuji 1-chome" and "Watabukitsuneana 2-chome" are "large damage".

Similar to the damage situation analysis models 68 and 134, the damage situation analysis model 152 is a machine learning model constructed by a method such as a neural network, a support vector machine, or boosting. The damage situation analysis model 152 is stored in the storage 30, is read out from the storage 30 by the RW control unit 45, and is output to the second processing unit 147.

As an example, as shown in FIG. 24, in the training phase, the damage situation analysis model 152 is trained by being given training data 160. The training data 160 is a set of a training compartment image 149L and a correct damage situation 153CA corresponding to the training compartment image 149L. The training compartment image 149L is obtained by inputting a bird's-eye view image of a certain area into the compartment image cutout unit 146. The correct damage situation 153CA is a result of actually discriminating the damage situation 153 of the compartment appearing in the training compartment image 149L by a qualified person such as a house damage certified person.

In the training phase, the training compartment image 149L is input to the damage situation analysis model 152. The damage situation analysis model 152 outputs a training damage situation 153L to the training compartment image 149L. Loss calculation of the damage situation analysis model 152 using a loss function is performed based on the training damage situation 153L and the correct damage situation 153CA. Various coefficients of the damage situation analysis model 152 are update-set according to a result of the loss calculation, and the damage situation analysis model 152 is updated according to the update-setting.

In the training phase of the damage situation analysis model 152, the series of processing of the input of the training compartment image 149L into the damage situation analysis model 152, the output of the training damage situation 153L from the damage situation analysis model 152, the loss calculation, the update-setting, the loss calculation, the update-setting, and the updating of the damage situation analysis model 152 are repeatedly performed while the training data 160 is being exchanged. The repetition of the series of processing is ended in a case where discrimination accuracy of the training damage situation 153L for the correct damage situation 153CA reaches a predetermined set level. The damage situation analysis model 152 in which the discrimination accuracy reaches the set level is stored in the storage 30 and is used by the second processing unit 147.

As described above, in the fifth embodiment, the damage situation analysis unit 145 analyzes the damage situation 153 for each compartment including the plurality of adjacent buildings 78 of the area 20. Thus, the analysis of the damage situation 153 can be completed in a shorter time than in a case where the analysis of the damage situation of each building 78 is performed. As a result, although somewhat rough, it is possible to quickly grasp the damage situation 153.

Sixth Embodiment

Figure 25:
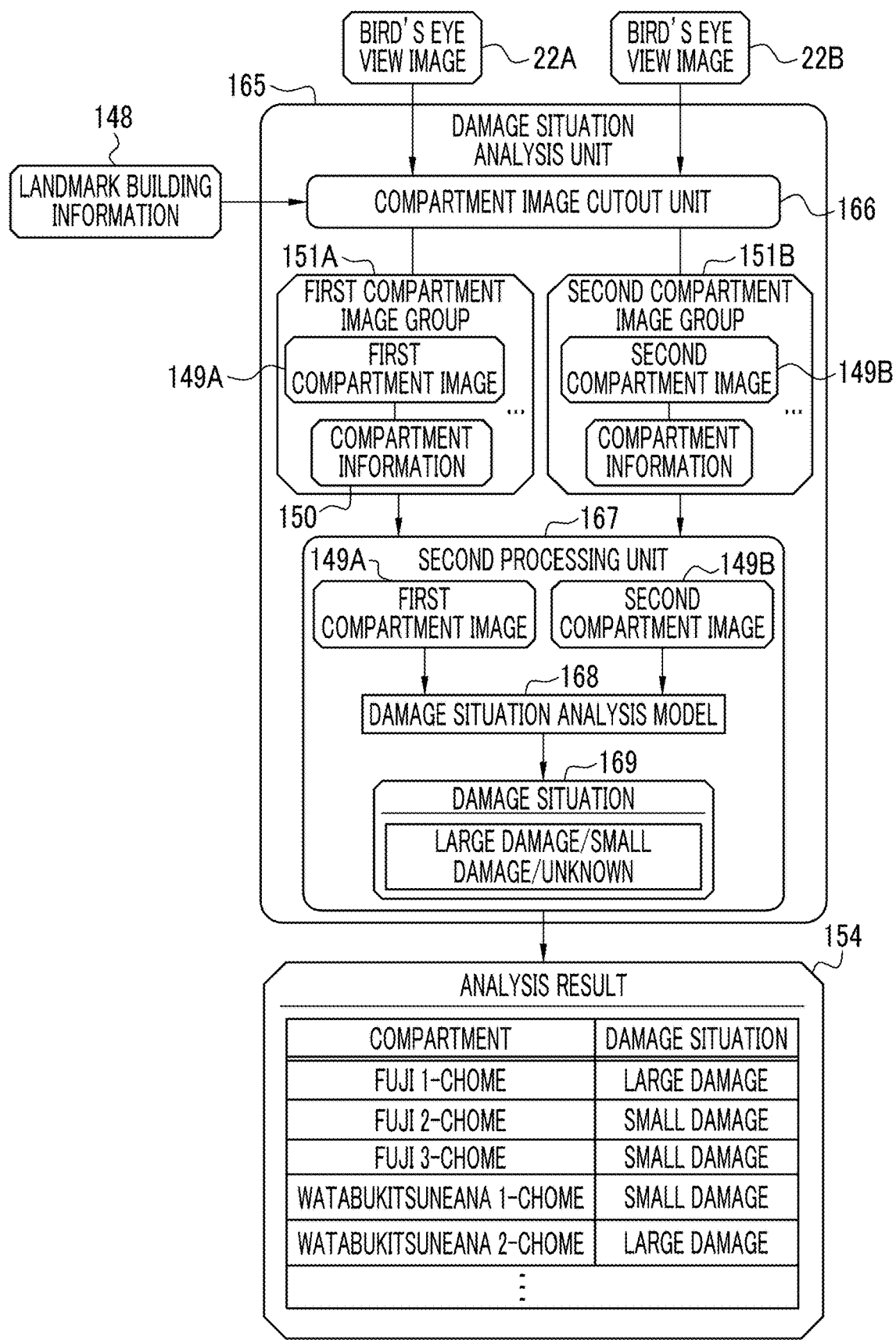
FIG. 25 is a block diagram showing details of a damage situation analysis unit of a sixth embodiment.
Figure 26:
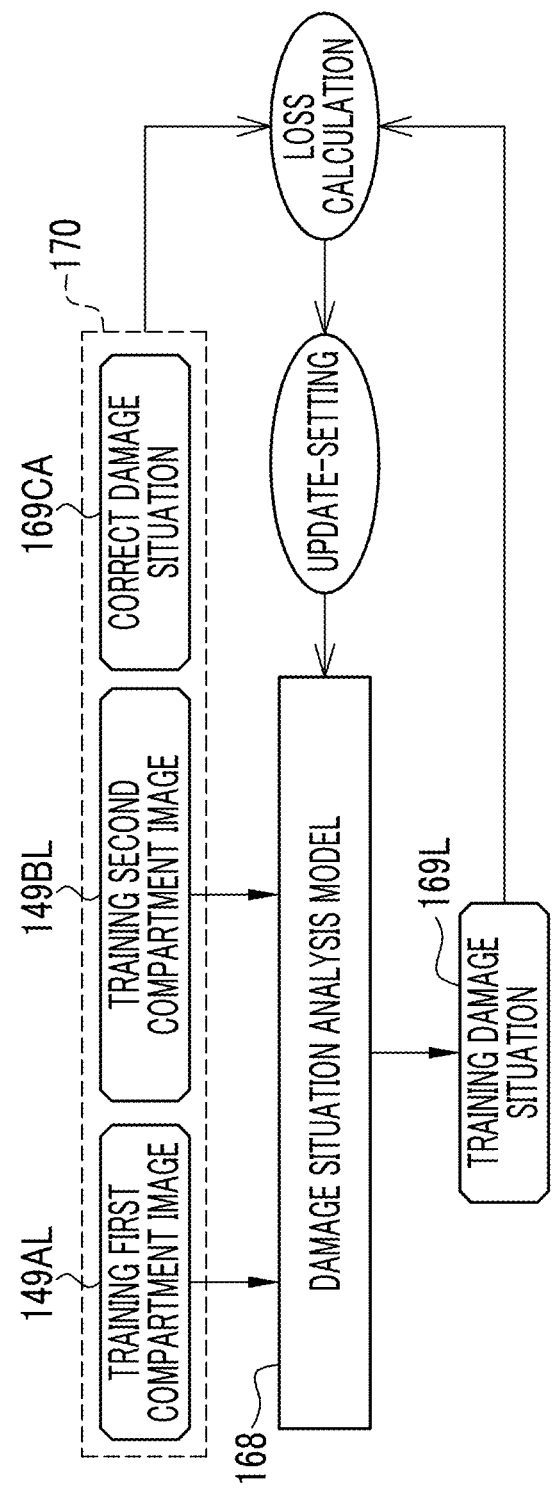
FIG. 26 is a diagram showing an outline of processing in a training phase of a damage situation analysis model of the sixth embodiment.

In a sixth embodiment shown in FIGS. 25 and 26, the damage situation for each compartment is analyzed based on the bird's-eye view images 22 captured by each of the plurality of surveillance cameras 10. As in the case of FIG. 20 and the like, hereinafter, for the sake of simplification, a case where two surveillance cameras 10A and 10B are used will be illustrated. The imaging ranges of the surveillance cameras 10A and 10B at least partially overlap each other, and the same compartment is captured in different aspects in the bird's-eye view image 22A and the bird's-eye view image 22B.

As an example, similar to the compartment image cutout unit 146 of the fifth embodiment, as shown in FIG. 25, a compartment image cutout unit 166 of a damage situation analysis unit 165 of the sixth embodiment cuts out a first compartment image 149A for each compartment from the bird's-eye view image 22A by the surveillance camera 10A while referring to the landmark building information 148. The compartment image cutout unit 166 cuts out a second compartment image 149B for each compartment from the bird's-eye view image 22B by the surveillance camera 10B. The compartment image cutout unit 166 outputs, to a second processing unit 167, a first compartment image group 151A including a plurality of sets of the first compartment image 149A and the compartment information 150, and a second compartment image group 151B including a plurality of sets of the second compartment image 149B and the compartment information 150.

The second processing unit 167 inputs the first compartment image 149A and the second compartment image 149B with which the same compartment information 150 is associated into a damage situation analysis model 168. A damage situation 169 is output from the damage situation analysis model 168. Similar to the damage situation 153 of the fifth embodiment, the damage situation 169 is any one of "large damage", "small damage", or "unknown". The second processing unit 167 outputs the damage situation 169 from the damage situation analysis model 168 for all the first compartment images 149A and the second compartment images 149B which are included in the first compartment image group 151A and the second compartment image group 151B and with which the same building information 65 is associated. The first compartment image 149A and the second compartment image 149B with which the same compartment information 150 is not associated are input to the damage situation analysis model 152 of the fifth embodiment to output the damage situation 153.

As an example, as shown in FIG. 26, in the training phase, the damage situation analysis model 168 is trained by being given training data 170. The training data 170 is a set of a training first compartment image 149AL, a training second compartment image 149BL, and a correct damage situation 169CA corresponding to the training first compartment image 149AL and the training second compartment image 149BL. The training first compartment image 149AL is obtained by inputting a bird's-eye view image of a certain area captured by a certain surveillance camera into the compartment image cutout unit 166. The training second compartment image 149BL is obtained by inputting a bird's-eye view image of a certain area captured by another surveillance camera into the compartment image cutout unit 166. The correct damage situation 169CA is a result of actually discriminating the damage situations 169 of the compartment appearing in the training first compartment image 149AL and the training second compartment image 149BL by a qualified person such as a house damage certified person.

In the training phase, the training first compartment image 149AL and the training second compartment image 149BL are input to the damage situation analysis model 168. The damage situation analysis model 168 outputs a training damage situation 169L to the training first compartment image 149AL and the training second compartment image 149BL. Loss calculation of the damage situation analysis model 168 using a loss function is performed based on the training damage situation 169L and the correct damage situation 169CA. Various coefficients of the damage situation analysis model 168 are update-set according to a result of the loss calculation, and the damage situation analysis model 168 is updated according to the update-setting.

In the training phase of the damage situation analysis model 168, the series of processing of the input of the training first compartment image 149AL and the training second compartment image 149BL into the damage situation analysis model 168, the output of the training damage situation 169L from the damage situation analysis model 168, the loss calculation, the update-setting, and the updating of the damage situation analysis model 168 are repeatedly performed while the training data 170 is being exchanged. The repetition of the series of processing is ended in a case where discrimination accuracy of the training damage situation 169L for the correct damage situation 169CA reaches a predetermined set level. The damage situation analysis model 168 in which the discrimination accuracy reaches the set level is stored in the storage 30 and is used by the second processing unit 167.

As described above, in the sixth embodiment, in a case where the compartment as an analysis target of the damage situation 169 is captured by the plurality of surveillance cameras 10, the damage situation analysis unit 165 analyzes the damage situation 169 of the compartment as the analysis target by using the bird's-eye view image 22 captured by each of the plurality of surveillance cameras 10. Thus, there is a high possibility that the damage situation 169 of the compartment which is not clear only from the bird's-eye view image 22 captured by one surveillance camera 10 can be grasped, and as a result, reliability of the analysis result 154 can be improved.

As in the fourth embodiment, the number of surveillance cameras 10 is not limited to two. Accordingly, both the compartment image 149 input to the damage situation analysis model 168 and the compartment image 149 cut out from the bird's-eye view image 22 captured by each of three or more surveillance cameras 10 may be used.

The compartment including the plurality of adjacent buildings is not limited to the illustrated chome. A rectangular region having a predetermined size with a road as a boundary may be used as the compartment.

Although any one of "large damage", "small damage", or "unknown" has been illustrated as the damage situations 153 and 169, the disclosed technology is not limited thereto. Similar to the damage situation 69 and the like, any one of "completely destroyed", "half destroyed", "safe", or "unknown" may be used.

In each of the above-described embodiments, although it has been assumed that the surveillance camera 10 is a visible light camera, the disclosed technology is not limited thereto. As the surveillance camera 10, an infrared camera may be prepared for capturing in the evening or at night.

In each of the above-described embodiments, although any one of "completely destroyed", "half destroyed", "safe", or "unknown" is used as an example of the damage situation on the assumption that an earthquake is mainly the disaster, the disclosed technology is not limited thereto. Any one of "inundation above floor level", "inundation under floor level", "safe", or "unknown" may be output as the damage situation on the assumption that flood damage is the disaster. Any one of "completely burned", "half burned", "safe", or "unknown" may be output as the damage situation on the assumption that large-scale fire is the disaster. A damage situation analysis model corresponding to a type of the disaster may be prepared, and the damage situation analysis model may be properly according to the type of the disaster.

The damage situation analysis model used in the second processing unit may be a model that also outputs the reliability of the damage situation for each building 78. In this case, in the case of the first embodiment in which the bird's-eye view image 22 captured by one surveillance camera 10 is used, only the damage situation of which the reliability is more than or equal to a preset first threshold value is adopted. On the other hand, in the case of the fourth embodiment in which the bird's-eye view images 22 captured by the plurality of surveillance cameras 10 are used, only the damage situation of which the reliability is more than or equal to a preset second threshold value is adopted. The second threshold value is set to a value lower than the first threshold value. The reason why the second threshold value is set lower than the first threshold value is that the reliability of the damage situation in a case where the bird's-eye view images 22 captured by the plurality of surveillance cameras 10 are used is higher.

Similarly, the damage situation analysis model used in the second processing unit of the fifth embodiment and the sixth embodiment may be used as a model that also outputs the reliability of the damage situation for each compartment. In this case, in the case of the fifth embodiment in which the bird's-eye view image 22 captured by one surveillance camera 10 is used, only the damage situation of which the reliability is more than or equal to the preset first threshold value is adopted. On the other hand, in the case of the sixth embodiment in which the bird's-eye view images 22 captured by the plurality of surveillance cameras 10 are used, only the damage situation of which the reliability is more than or equal to the preset second threshold value (<first threshold value) is adopted.

In a case where the effective field of view range 55 is less than the preset threshold value, a super-resolution technology using a machine learning model may be applied to the bird's-eye view image 22 to set the bird's-eye view image 22 as a super-resolution bird's-eye view image 22, and the damage situation may be analyzed by using the super-resolution bird's-eye view image 22. However, since the super-resolution bird's-eye view image 22 is a so-called fake image, it is preferable to clearly indicate that the super-resolution bird's-eye view image is only for reference on the damage situation display screen 58.

In each of the above-described embodiments, for example, the following various processors can be used as a hardware structure of processing units that execute various kinds of processing such as the RW control unit 45, the effective field of view range derivation units 46 and 121, the control signal generation units 47 and 122, the transmission control unit 48, the damage situation analysis units 49, 130, 145, and 165, the screen distribution control unit 50, the building information assignment units 60, 85, and 131, the building image cutout units 61, 86, and 132, the first processing unit 62, the second processing units 87, 133, 147, and 167, and the compartment image cutout units 146 and 166. As described above, in addition to the CPU 32 which is a general-purpose processor that functions as various processing units by executing software (operation program 40), the various processors include a programmable logic device (PLD), which is a processor capable of changing a circuit configuration after manufacture, such as a field programmable gate array (FPGA), and a dedicated electrical circuit, which is a processor having a circuit configuration specifically designed in order to execute specific processing such as an application specific integrated circuit (ASIC).

One processing unit may be constituted by one of these various processors, or may be constituted by a combination of two or more processors of the same type or different types (for example, a combination of a plurality of FPGAs or a combination of a CPU and an FPGA). The plurality of processing units may be constituted by one processor.

As an example in which the plurality of processing units are constituted by one processor, firstly, one processor is constituted by a combination of one or more CPUs and software as represented by computers such as clients and servers, and this processor functions as the plurality of processing units. Secondly, a processor that realizes the functions of the entire system including the plurality of processing units via one integrated circuit (IC) chip is used as represented by a system on chip (SoC). As described above, the various processing units are constituted by using one or more of the various processors as the hardware structure.

More specifically, an electric circuitry in which circuit elements such as semiconductor elements are combined can be used as the hardware structure of these various processors.

The disclosed technology can also appropriately combine various embodiments and/or various modification examples described above. The disclosed technology is not limited to the above embodiments, and may adopt various configurations without departing from the gist.

The contents described and shown above are detailed descriptions for the portions related to the disclosed technology, and are merely examples of the disclosed technology. For example, the above description of the configurations, functions, actions, and effects is an example of the configurations, functions, actions, and effects of the portions of the disclosed technology. Thus, the deletion of unnecessary portions, the addition of new elements, or the substitution may be performed for the contents described and shown above without departing from the gist of the disclosed technology. In order to avoid complications and facilitate understanding of the portions related to the disclosed technology, in the contents described and shown above, common technical knowledge that does not particularly require description is not described in order to enable the implementation of the disclosed technology.

In the present specification, "A and/or B" has the same meaning as "at least one of A or B". That is, "A and/or B" means that only A may be used, only B may be used, or a combination of A and B may be used. In the present specification, the same concept as "A and/or B" is also applied to a case where three or more matters are expressed by "and/or".

All the documents, patent applications, and technical standards described in the present specification are incorporated in the present specification by reference to the same extent as a case where individual documents, patent applications, and technical standards are specifically and individually noted to be incorporated by reference.

What is claimed is:

1. A disaster information processing system comprising:
   a surveillance camera that captures a bird's eye view image of a disaster-stricken area; and
   a disaster information processing apparatus that is connected to the surveillance camera via a network, and that includes:
   a processor; and
   a memory connected to or built in the processor,
   wherein the processor is configured to:
   derive an effective field of view range in the bird's eye view image, a damage situation for each building of the disaster-stricken area being able to be analyzed in the effective field of view range, and the effective field of view range changing depending on an environmental condition of the disaster-stricken area;
   control an operation of the surveillance camera based on the derived effective field of view range;
   analyze the damage situation for each building of the disaster-stricken area by using the bird's eye view image, to generate an analysis result; and distribute, to a client terminal via the network, screen data of a damage situation display screen that is generated based on the analysis result, and that is displayed on a display of the client terminal.

2. The disaster information processing system according to claim 1,
wherein the processor is configured to:
perform at least one of setting of a zoom magnification of the surveillance camera, setting of a tilt angle of the surveillance camera, or setting of whether or not to capture the bird's eye view image based on the effective field of view range.

3. The disaster information processing system according to claim 1,
wherein the processor is configured to:
acquire the effective field of view range from the bird's eye view image captured in real time by the surveillance camera.

4. The disaster information processing system according to claim 1,
wherein the effective field of view ranges corresponding to the environmental conditions of a plurality of patterns are stored in a storage unit in advance, and
the processor is configured to:
acquire the effective field of view range corresponding to a current environmental condition of the disaster-stricken area from the storage unit.

5. The disaster information processing system according to claim 1,
wherein a plurality of the surveillance cameras are provided, and
the processor is configured to:
control an operation of each of the plurality of surveillance cameras based on the effective field of view range of each of the plurality of surveillance cameras.

6. The disaster information processing system according to claim 1,
wherein the processor is configured to:
analyze the damage situation of a building as an analysis target of the damage situation by using the bird's eye view images captured by a plurality of the surveillance cameras in a case where the building as the analysis target is captured by the plurality of surveillance cameras.

7. The disaster information processing system according to claim 1,
wherein the processor is configured to:
analyze the damage situation for each compartment including a plurality of adjacent buildings of the disaster-stricken area by using the bird's eye view image.

8. The disaster information processing system according to claim 7,
wherein the processor is configured to:
analyze the damage situation of a compartment as an analysis target of the damage situation by using the bird's eye view images captured by a plurality of the surveillance cameras in a case where the compartment as the analysis target is captured by the plurality of surveillance cameras.

9. An operation method of a disaster information processing system that includes a surveillance camera that captures a bird's eye view image of a disaster-stricken area and a disaster information processing apparatus that is connected to the surveillance camera via a network, comprising:
deriving an effective field of view range in the bird's eye view image, a damage situation for each building of the disaster-stricken area being able to be analyzed in the effective field of view range, and the effective field of view range changing depending on an environmental condition of the disaster-stricken area;
controlling an operation of the surveillance camera based on the derived effective field of view range;
analyzing the damage situation for each building of the disaster-stricken area by using the bird's eye view image, to generate an analysis result; and
distributing, to a client terminal via the network, screen data of a damage situation display screen that is generated based on the analysis result, and that is displayed on a display of the client terminal.

10. A non-transitory computer-readable storage medium storing an operation program of a disaster information processing system that includes a surveillance camera that captures a bird's eye view image of a disaster-stricken area and a disaster information processing apparatus that is connected to the surveillance camera via a network, the program causing a computer to execute processing of:
deriving an effective field of view range in the bird's eye view image, a damage situation for each building of the disaster-stricken area being able to be analyzed in the effective field of view range, and the effective field of view range changing depending on an environmental condition of the disaster-stricken area;
controlling an operation of the surveillance camera based on the derived effective field of view range;
analyzing the damage situation for each building of the disaster-stricken area by using the bird's eye view image, to generate an analysis result; and
distributing, to a client terminal via the network, screen data of a damage situation display screen that is generated based on the analysis result, and that is displayed on a display of the client terminal.

* * * * *